(12) United States Patent  
Oishi

(10) Patent No.: US 8,861,519 B2
(45) Date of Patent: Oct. 14, 2014

(54) DATA FILTERING APPARATUS AND DATA FILTERING METHOD

(75) Inventor: Noriaki Oishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 13/064,700

(22) Filed: Apr. 11, 2011

(65) Prior Publication Data

US 2011/0292934 A1 Dec. 1, 2011

(30) Foreign Application Priority Data

May 31, 2010 (JP) ................................ 2010-123700

(51) Int. Cl.
*H04L 12/28* (2006.01)
*H04N 21/434* (2011.01)
*H04H 40/27* (2008.01)
*H04N 21/426* (2011.01)

(52) U.S. Cl.
CPC ............ *H04H 40/27* (2013.01); *H04N 21/434* (2013.01); *H04N 21/42615* (2013.01)
USPC ........................................................ 370/389

(58) Field of Classification Search
None
See application file for complete search history.

(56) References Cited

U.S. PATENT DOCUMENTS

| 2001/0009034 A1* | 7/2001 | Lee ................................. 725/39 |
| 2005/0105537 A1* | 5/2005 | Motomura ............... 370/395.64 |
| 2005/0180452 A1* | 8/2005 | Rhee ............................. 370/464 |
| 2008/0144747 A1* | 6/2008 | Tomizawa ..................... 375/343 |

FOREIGN PATENT DOCUMENTS

JP 2005-333474 12/2005

* cited by examiner

*Primary Examiner* — Dang Ton
*Assistant Examiner* — Ronald H Davis
(74) *Attorney, Agent, or Firm* — Sony Corporation

(57) ABSTRACT

Disclosed herein is a data filtering apparatus, including: a plurality of pre-filters configured to extract a designated type of data from input data carrying a plurality of types of data; a plurality of post-filters configured to extract, from the data extracted by the pre-filter designated to be connected, the data that matches a designated data extraction condition; and a filter connection information holding device configured to hold filter connection information for designating at least one of the pre-filters to be connected, in correspondence with each of the post-filters.

12 Claims, 17 Drawing Sheets

FIG.1

| CATEGORY | TABLE NAME/MESSAGE NAME | |
|---|---|---|
| CHANNEL TUNING INFORMATION | PAT | Program Association Table |
| | CAT | Conditional Access Table |
| | PMT | Program Map Table |
| | NIT | Network Information Table |
| LIMITED RECEPTION INFORMATION | ECM | Entitlement Control Message |
| | EMM | Entitlement Management Message |
| PROGRAM INFORMATION (EPG) | BIT | Broadcast Information Table |
| | SDT | Service Description Table |
| | EIT | Event Information Table |
| | TOT | Time Offset Table |
| DOWNLOAD INFORMATION | SDTT | Software Download Table |
| | CDT | Common Date Table |
| DATA BROADCAST CONTENTS | DII | Download Info Indication Message |
| | DDB | Download Date Block Message |
| | - | Event Message |

| PACKET FILTER NO. | PACKET FILTER CONDITION INFORMATION |
|---|---|
| 0 | PACKET EXTRACTION INFORMATION #0 |
| 1 | PACKET EXTRACTION INFORMATION #1 |
| ⋮ | ⋮ |
| M-2 | PACKET EXTRACTION INFORMATION #(M-2) |
| M-1 | PACKET EXTRACTION INFORMATION #(M-1) |

FIG. 9

| SECTION FILTER NO. | SECTION FILTER CONDITION INFORMATION | | | | | |
|---|---|---|---|---|---|---|
| | SECTION EXTRACTION INFORMATION #0 | SECTION EXTRACTION INFORMATION #1 | ......... | SECTION EXTRACTION INFORMATION #(N-2) | SECTION EXTRACTION INFORMATION #(N-1) | |
| | PACKET FILTER DESIGNATION INFORMATION #0 | PACKET FILTER DESIGNATION INFORMATION #1 | ......... | PACKET FILTER DESIGNATION INFORMATION #(N-2) | PACKET FILTER DESIGNATION INFORMATION #(N-1) | |
| 0 | | | | | | |
| 1 | | | | | | |
| ......... | | | | | | |
| N-2 | | | | | | |
| N-1 | | | | | | |

520 — table; 521 — section extraction information group; 522 — packet filter designation information group

DATA FILTERING APPARATUS AND DATA FILTERING METHOD

BACKGROUND OF THE INVENTION

1. Field of the Invention

The present invention relates to a data filtering apparatus. More particularly, the invention relates to an apparatus and a method for filtering sections transmitted by digital broadcasts.

2. Description of the Related Art

There exist standards exemplified by MPEG-2 that define the transmission of transport streams (TS) of digital broadcasts. According to such digital broadcast standards, video and audio data are put into transport stream packets in the packetized elementary streams (PES) format before being transmitted. The data other than the video and audio data, such as tables and messages, are placed in transport stream packets in the section format when transmitted.

When acquiring desired table or message data from the received transport stream, a digital broadcast receiver or the like may typically perform a two-step filtering process using packet filters and section filters. That is, a packet filter first selects a packet that contains a desired session from the transport stream and extracts the section from the payload of the selected packet. Then a section filter extracts the section data constituting the desired table or message from the extracted section.

Under operational guidelines of the digital broadcast standards, the above-mentioned digital broadcast receiver is required to have a plurality of packet filters and a plurality of section filters. Also, the digital broadcast receiver is required to connect a plurality of section filters to the same packet filter. Furthermore, when connecting the filters, the digital broadcast receiver needs to meet the following two filter connection requirements: First, it is required that any one packet filter be allowed to connect with any number of section filters. Second, it is required that any section filter be allowed to connect with any packet filter.

Traditionally, the above filter connection requirements have been met by the technique of assigning a connection information register to each of the packet filters, the register indicating connective relations of the packet filter in question to the section filters. Each of these connection information registers has a capacity of as many bits as the number of the configured section filters. That is, if N section filters are provided, then each connection information register needs to have a capacity of N bits. Each of the bits constituting the connection information register corresponds to one section filter. In a given connection information register, a "1" bit corresponds to the section filter designated to connect with the packet filter to which the register is assigned.

In the above-described traditional setup, however, the bit capacity of the connection information registers as a whole increases inordinately with a growing number of the packet filters and section filters being configured. This may typically lead to such problems as higher costs due to an expanded scale of circuitry.

Ordinarily, the above problems are circumvented by the technique of limiting the range of section filters that can connect to one packet filter. This technique is intended to make the number of the bits constituting each connection information filter smaller than the number of the configured section filters, thereby suppressing the increase in the bit capacity of the connection information registers as a whole. The scope of limiting the range of the section filters is determined typically by taking into consideration a maximum allowable number of section types (tables or messages) that can be transmitted using a single transport stream packet under the current state of the art. According to this technique, the limitation of the range of the section filters is accompanied by an arrangement that allows the center bit position of the connection information register to correspond to the central section filter in the array of the configured section filters (e.g., see Japanese Patent Laid-open No. 2005-333474).

SUMMARY OF THE INVENTION

The above-described traditional technique limits the range of the section filters that can connect to one packet filter in consideration of the operational guidelines for today's digital broadcasts. However, if changes were made in the operational guidelines leading to an increased number of sections that can be transported by a single transport stream packet, such changes might not be handled by the traditional technical arrangements. Such changes would also be difficult to address flexibly in view of the fact that separate circuits are needed to establish the correspondence between the section filters on the one hand and the bit positions in the connection information registers for the section filters on the other hand. Such changes in the operational guidelines may well occur from now on. To deal with these changes flexibly requires, for example, that the apparatus for filtering section data be guarded against decreases in extensibility or convenience.

The present invention has been made in view of the above circumstances and provides a data filtering apparatus and a data filtering method for effectively suppressing the increase in the scope of circuitry resulting from a growing number of packet filters and section filters while maintaining the extensibility and convenience of the apparatus.

In carrying out the present invention and according to one embodiment thereof, there is provided a data filtering apparatus, including: a plurality of pre-filters configured to extract, a designated type of data from input data carrying a plurality of types of data; a plurality of post-filter configured to exact, from the data extracted by the pre-filter designed to be connected, the data matches a designated data extraction condition; and a filter connection information holding device configured to hold filter connection information for designating at least one of the pre-filters to be connected, in correspondence with each of the post-filters. This inventive structure provides the effect of allowing the post-filters to input data selectively from the pre-filters designated by the filter connection information.

Preferably, the filter connection information may have at least one filter designation information part indicating a filter identifier identifying one of the pre-filters to be designated to be connected. This preferred structure provides the effect of allowing each of the post-filters to input data selectively from a plurality of pre-filters designated by the filter connection information.

Preferably, the filter designation information part may be formed by a bit sequence made up of as many bits as are needed to indicate a maximum value of the filter identifier. This preferred structure provides the effect of indicating the maximum value of the filter identifier in the filter designation information part using a minimum necessary number of bits.

Preferably, the data filtering apparatus of the embodiment of the present invention may further include a filter condition information holding device configured to hold filter condition information in correspondence with each of the post-filters, the filter condition information associating the data extraction condition with at least one of the filter identifiers indicated by the filter designation information part in the filter connection information; wherein the post-filters, based on the filter condition information corresponding thereto, may extract the data that matches the data extraction condition from the data extracted by the pre-filter that is assigned the filter identifier. This preferred structure provides the effect of allowing the post-filters to reference the filter condition information corresponding thereto, thus recognizing the data extraction condition as well as the pre-filters designated to be connected.

Preferably, the filter condition information holding device may have an information correspondence data portion indicating the number of the filter identifiers to be associated with each of the data extraction conditions; wherein, in order of the numbers assigned to each of the data extraction conditions, each of the data extraction conditions may be associated with as many filter identifiers as the number of the filter identifiers indicated by the information correspondence data portion. This preferred structure provides the effect of forming the filter condition information associated with a plurality of filter identifiers with regard to a single data extraction condition.

In carrying out the present invention and according to the embodiment thereof, there is provided a data filtering method, including the steps of: causing at least one of a plurality of pre-filters to extract a designated type of data from input data carrying a plurality of types of data, the at least one pre-filter being designated to be connected by filter connection information; inputting the extracted data; and causing a plurality of post-filters to extract, from the extracted input data, the data that matches a designated data extraction condition.

The present invention, when typically embodied as outlined above, suppresses effectively the increase in the scope of circuitry resulting from a growing number of packet filters and section filters while maintaining the extensibility and convenience of the apparatus.

BRIEF DESCRIPTION OF THE DRAWINGS

FIG. 1 is a tabular view showing typical tables and messages transmitted in the section format;

FIG. 8 is a schematic view showing a typical structure of a packet filter condition information holding device;

FIG. 9 is a schematic view showing a typical structure of a section filter condition information holding device;

DETAILED DESCRIPTION OF THE PREFERRED EMBODIMENTS

The preferred embodiments of the present invention will now be described below. The description will be given under the following headings:

1. First embodiment (a data filtering apparatus structured based on connection information registers each corresponding to each of the section filters configured, on the assumption that one section filter connects to one packet filter)

2. Second embodiment (a data filtering apparatus structured based on connection information registers each corresponding to each of the section filters configured, on the assumption that one section filter may connect to two packet filters)

3. A typical appliance to which the embodiments of the invention may be applied (a TV set realized using the embodiments of the invention)

<1. First Embodiment>

[Sections]

Explained first are the sections to be extracted by the data filtering apparatus embodying the invention. Under the digital broadcast standards complied with by the embodiments of the invention, data is transmitted using signals in the format called transport streams. In the transport streams, compression-encoded video and audio data are transmitted in the format called PES (packetized elementary stream). Those types of data other than the video and audio data, such as tables and messages, are transmitted in the format called sections.

FIG. 1 lists typical tables and messages. The table and message data may be roughly divided into five categories: channel tuning information, limited reception information, program information (EPG), download information, and data broadcast contents.

The channel tuning information is used to identify and decode programs. For example, the channel tuning information may include a program association table (PAT), a conditional access table (CAT), a program map table (PMT), and a network information table (NIT).

The limited reception information is used to descramble broadcast data. The limited reception information may include an entitlement control message (ECM) and an entitlement management message (EMM).

The program information is used by the reception apparatus to create an electronic program guide. For example, the program information may include a broadcast information table (BIT), a service description table (SDT), an event information table (EIT) and a time offset table (TOT).

The download information is used to offer a data download service. The download information may include a software download table (SDTT) and a common data table (CDT).

The data broadcast contents are information used by digital broadcasts to broadcast data. For example, the data broadcast contents may include a download information indication message (DII), a download data block message (DDB), and an event message.

Figure 2:
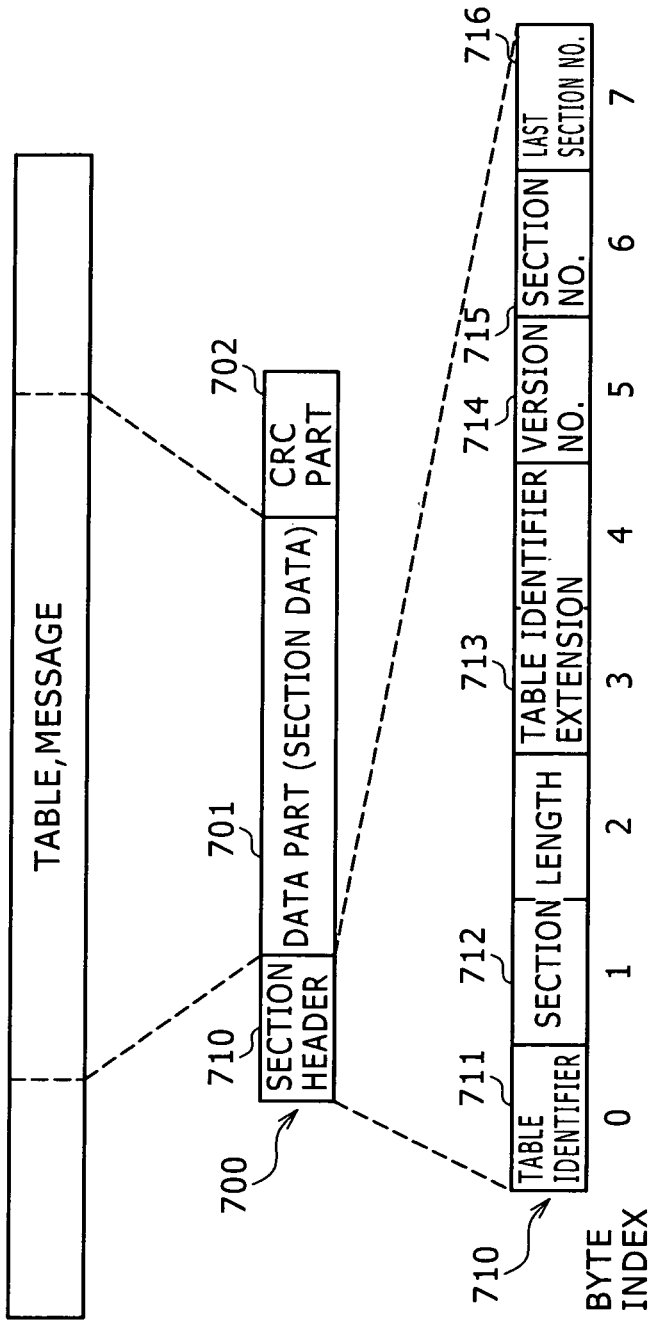
FIG. 2 is a schematic view showing a typical structure of a section.

FIG. 2 shows a typical structure of a section 700. As illustrated, the section 700 is made up of a section header 710 at the top, followed by a data part 701 and a CRC (cyclic redundancy check) part 702, in that order. The data part 701 accommodates section data formed by a divided portion in a predetermined length of a table or a message. The CRC part 702 stores a code for checking any error that may occur in the data of the section 700.

The section header 710 may be formed by, say, eight bytes. A one-byte field indicated by the first byte index "0" stores a table identifier 711. An ensuing two-byte field indicated by byte indexes "1" and "2" stores a section length 712. A two-byte field indicated by byte indexes "3" and "4" stores a table identifier extension 713. A one-byte field indicated by a byte index "5" stores a version number 714. A one-byte field indicated by a byte index "6" stores a section number 715. A one-byte field indicated by the last byte index "7" stores a last section number 716.

In the above-mentioned section header 710, the table identifier 711 stores an identifier for identifying the table or message held in the data part 701. The section length field 712 stores information indicating the size of the section 700. The table identifier extension field 713 is provided for user definition.

The version number field 714 stores the version number of the table or message held in the data part 701. For example, the version number 714 may be incremented every time the content of the corresponding table or message is updated.

The section number 715 indicates numerically the position of section data in the table or message, the section data being held in the data part 701 of the current section 700. The last section number 716 indicates the number of the last section in a section data concatenation making up the table or message identified by the table identifier 711. For example, a single table or message is reconstituted by concatenating the section data in ascending order of their section numbers 715 up to the last section number 716.

Figure 3:
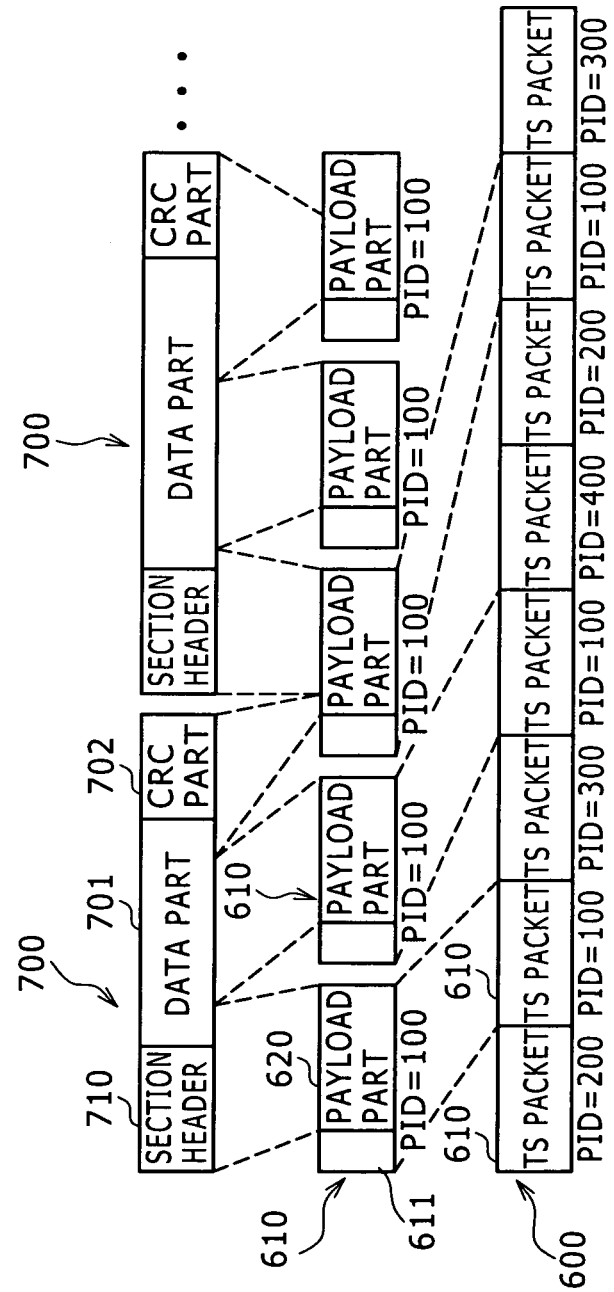
FIG. 3 is a schematic view showing a typical structure of a transport stream containing the section.

FIG. 3 shows how sections are typically transmitted in a transport stream. FIG. 3 indicates sections 700 each holding table or message data. These sections 700 may be arrayed typically in the order in which the section data in the data parts 701 are concatenated. Each of the sections 700 arrayed in this manner is divided by a predetermined length corresponding to the size of a payload part 620 in a transport stream packet 610 as shown in FIG. 3.

A header part 611 of the transport stream packet 610 stores a packet identifier (PID). If the transport packet 610 has its payload part 620 accommodating a section 700, then the packet identifier in question describes a predetermined value corresponding to the type of the section 700. In FIG. 3, the packet identifier is "100" corresponding to the type of the section 700.

The transport stream (TS) packet 610 holding the packet identifier "100" is time-division multiplexed with other transport stream packets 610 holding the packet identifiers of other values. These packets make up a transport stream 600. In FIG. 3, for example, packet identifier values "200," "300" and "400" other than the packet identifier "100" are indicated. The transport stream packets having these packet identifiers may, for example, hold video and audio data or the sections of other types.

[Structure of the Filters for Acquiring Sections]

The transmitter side such as a broadcasting station transmits sections 700 of the same content periodically. In turn, a receiver of digital broadcasts may start receiving the transmission at any time of day and still be able to receive eventually the desired table or message data. Where an updated table or message is to be transmitted, the update is made by incrementing the version number 714 of the sections 700 holding the table or message data in their data parts 701. The receiver side acquires the table or message data and extracts selectively only those sections 700 whose version numbers 714 have been updated. The receiver side then updates the content of the table or message using the data held in the data parts 701 of the selected sections 700. That is, not all data making up the updated table or message need to be acquired depending on the update of the table or message.

Addressing the above-described setup, the digital broadcast receiver may be structured, for example, to filter section data as follows: The transport stream packets 610 making up the transport stream 600 acquired through reception are subjected to a filtering process whereby desired transport stream packets 610 are selectively extracted. For filtering purposes, the digital broadcast receiver possesses packet filters. The packet filters perform filtering of the transport stream packets 610 using, for example, the packet identifier value designated as a filtering condition.

Next, from the transport stream packets 610 extracted by the packet filters, the sections 700 holding the data for use in making up the desired table or message are extracted. For this extraction process, the digital broadcast receiver possesses section filters. The section filters perform filtering of the sections 700 using, for example, the table identifier or version number designated as a section filter condition. That is, a two-step approach is adopted to implement the filtering process using the packet filters and section filters.

For example, the digital broadcast standards complied with by the embodiments of the present invention stipulate the following operational rules on packet identifiers and sections:

At least one packet identifier and at least one type of section must be transmitted; and A plurality of types of sections must be transmitted using the same packet identifier.

In keeping with the above operational rules, the digital broadcast receiver needs to meet the following two requirements:

The digital broadcast receiver must possess a plurality of packet filters and a plurality of section filters; and The digital broadcast receiver must be capable of connecting a plurality of section filters to the same packet filter.

In this context, the wording "connecting a packet filter with a section filter" signifies "inputting the data extracted by a packet filter to a section filter."

In addition, the digital broadcast receiver is expected preferably to meet the following two requirements regarding the connection of packet filters with section filters (the requirements may also be called the filter connection requirements hereunder):

The digital broadcast receiver should preferably be capable of connecting any number of section filters to a desired packet filter; and The digital broadcast receiver should preferably be capable of connecting a desired section filter to a desired packet filter.

By meeting the preceding two requirements, the digital broadcast receiver can address diverse kinds of section broadcasts more flexibly than ever.

Figure 4:
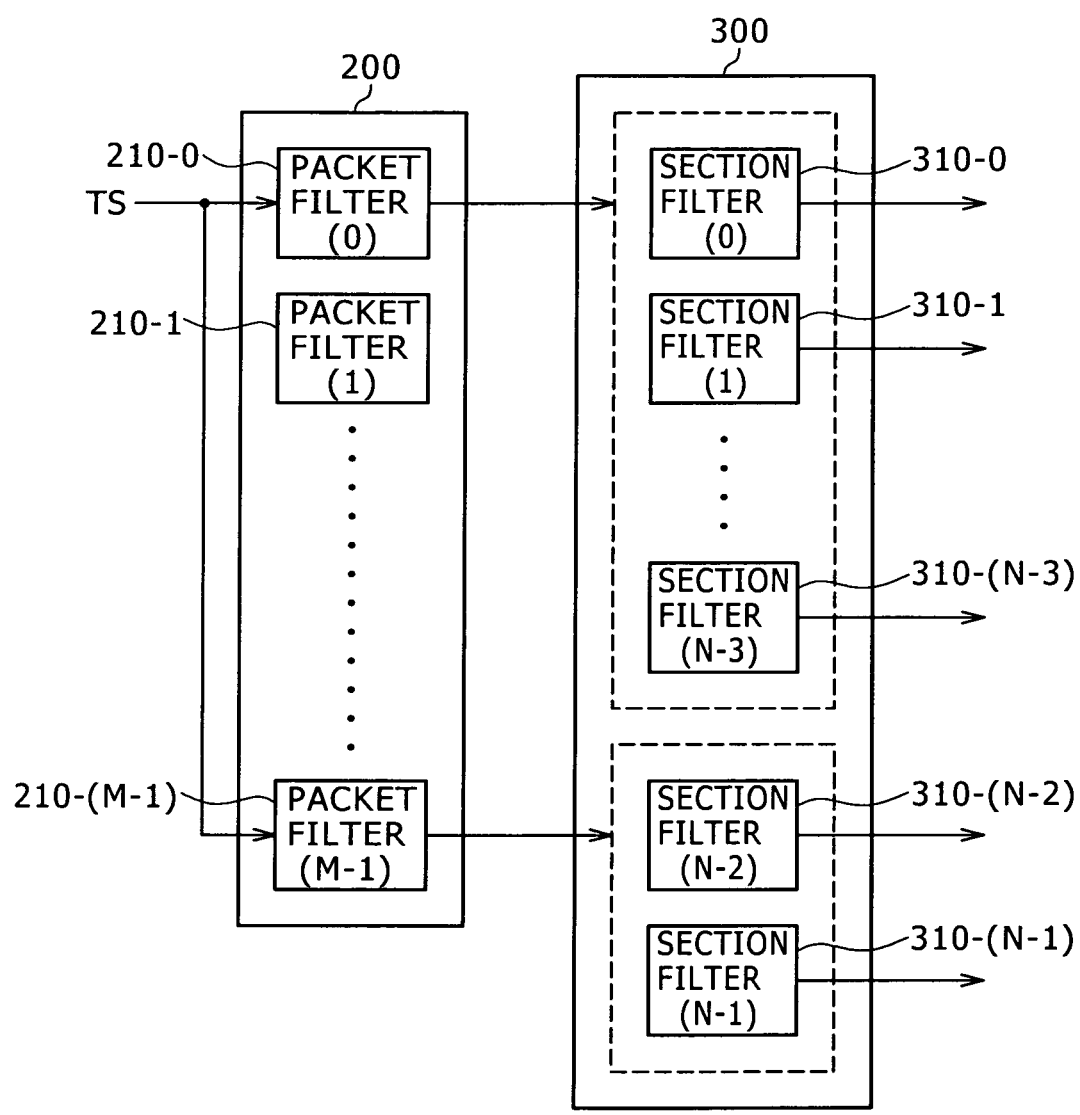
FIG. 4 is a schematic view showing typical structures of packet filters and section filters addressing two-step filtering process.

FIG. 4 shows typical structures of packet filters and section filters that address the above-mentioned two-step filtering process. In FIG. 4, a packet filter device 200 and a section filter device 300 are indicated. The packet filter device 200 contains a total of M packet filters 210-0 through 210-(M−1) (numbered 0 through (M−1)). With each packet filter 210, the number shown in parentheses is the number assigned to the packet filter 210 in question. The section filter device 300 contains a total of N section filters 310-0 through 310-(N−1) (numbered 0 through (N−1)).

In addition, FIG. 4 shows the packet filter 210-0 (numbered 0) being connected with (N−2) section filters 310-0 through 310-(N−3) (numbered 0 through (N−3)). Also, the packet filter 210-(M−1) (numbered M−1) is connected with two section filters 310-(N−2) and 310-(N−1) (numbered (N−2) and (N−1)).

The kinds of connections shown in FIG. 4 between the packet filters 210 and the section filters 310 meet the first two requirements mentioned above. That is, there exist multiple packet filters and multiple section filters, with a plurality of section filters 310 connected to the same packet filter 210. In addition, the connections between the packet filters 210 and the section filters 310 should preferably meet the preceding filter connection requirements. Ordinarily, these requirements have been met by installing connection information registers each corresponding to each of the configured packet filters. Each of these sets of connection information has as many bits as the total number of the section filters 310, with the bit positions corresponding to the section filters. The values in the bit positions corresponding to at least one section filter are each set to "1." In this manner, at least one section filter is designated to connect with a single packet filter.

However, the bit capacity of the connection information registers as a whole increases inordinately in proportion to the growing numbers of the packet filters 210 and section filters 310. For example, if it is assumed that M stands for the number of packet filters 210 and N for the number of section filters 310, then it is necessary to prepare a bit capacity of (M×N) for the entire connection information filters. More specifically, if there are 32 packet filters 210 and 32 section filters 310, then the bit capacity amounts to 1,024 bits. If there are 64 packet filters 210 and 64 section filters 310, the bit capacity rises to 4,096 bits. If 128 packet filters 210 and 128 section filters 310 are provided, then the bit capacity reaches 16,384 bits.

Traditionally, in order to suppress the increase in the bit capacity while the connection information registers are still in use, it is necessary, for example, to limit the range of the section filters that can connect to one packet filter 210. It is also necessary to prepare circuits that determine the range of the section filters corresponding to the bit positions in the connection information registers. With such a structure, it is difficult to obtain flexibility or convenience in connecting the packet filters 210 with the section filters 310.

The present invention, when embodied, aims to meet the filter connection requirements above using a structure that suppresses the increase in the bit capacity in proportion to the growing numbers of packet filters 210 and section filters 310 while not detracting from the flexibility and convenience mentioned above. The inventive structure will now be described below.

[Packet Filter Connection Information for Use by Embodiments of the Invention]

For embodiments of the present invention, the information indicative of the connective relations between the packet filters 210 and the section filters 310 is made to relate not each packet filter 210 to the section filters 310 but each section filter 310 to the packet filters 210. The information about the connective relations will be referred to as the packet filter connection information hereunder because the information indicates the connective relations with regard to the packet filters 210.

Figure 5:
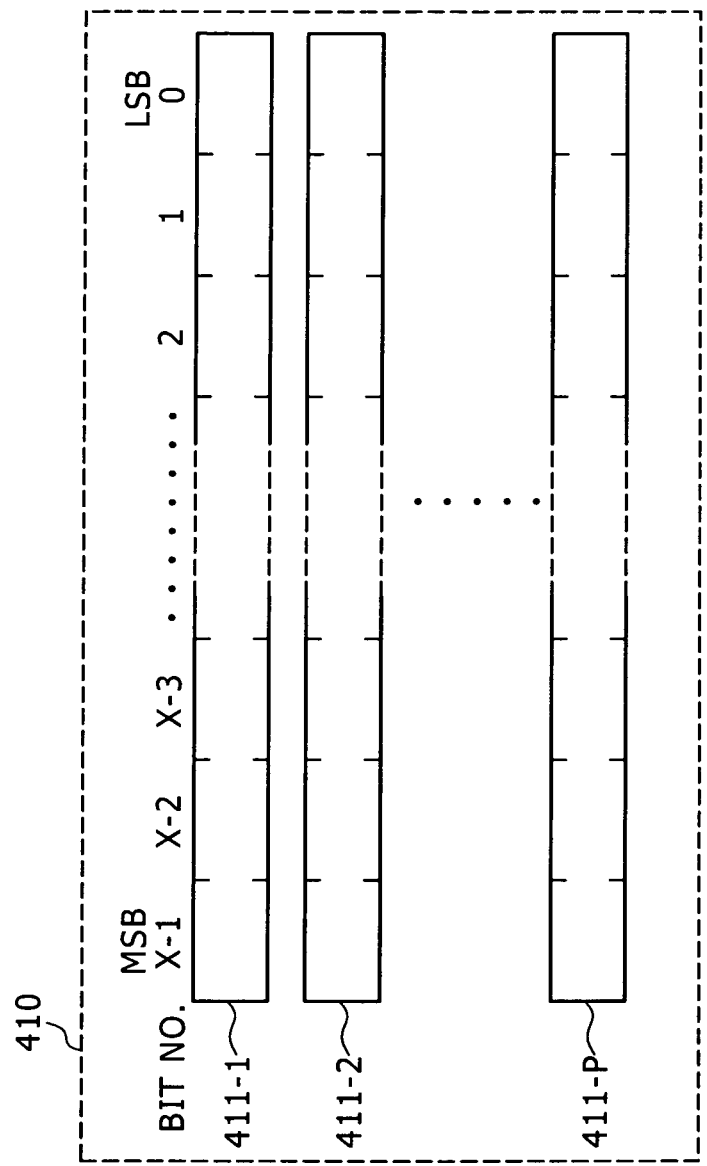
FIG. 5 is a schematic view showing a typical structure of packet filter connection information according to an embodiment of the invention.

FIG. 5 shows a typical structure of packet filter connection information 410 according to the invention embodied as described herein. The packet filter connection information 410 corresponding to one section filter is formed with at least one packet filter designation information part 411. The structure in FIG. 5 is shown to have as many as P packet filter designation information parts 411-1 through 411-P.

Each packet filter designation information part 411 is made up of an array of X bits numbered 0 through (X−1) as illustrated. Values 0 through ($2^x$−1) represented in the X bits are used to designate the numbers of the packet filters 210. The bit count X needed for the packet filter connection information 410 is determined by the total number M of the configured packet filters 210. For example, if the total number M of the packet filters 210 is represented in 2's power for purposes of description, then the bit count X is given as X=$\log_2$M.

As will be understood from the preceding description, one packet filter designation information part 411 designates only one packet filter 210 to be connected. It follows that the number of packet filters 210 that can be designated to connect with one section filter 310 is determined by the number of the packet filter designation information parts 411 provided in the packet filter connection information 410. A first embodiment of the present invention presupposes that, as a basic example, the packet filter connection information 410 has a single packet filter designation information part 411. That is, according to the first embodiment of the invention, one section filter 310 can connect with only one packet filter 210. The packet filter connection information 410 is an example of the filter connection information described in the appended claims. The packet filter designation information part 411 is an example of the filter designation information part described in the appended claims.

Figure 6:
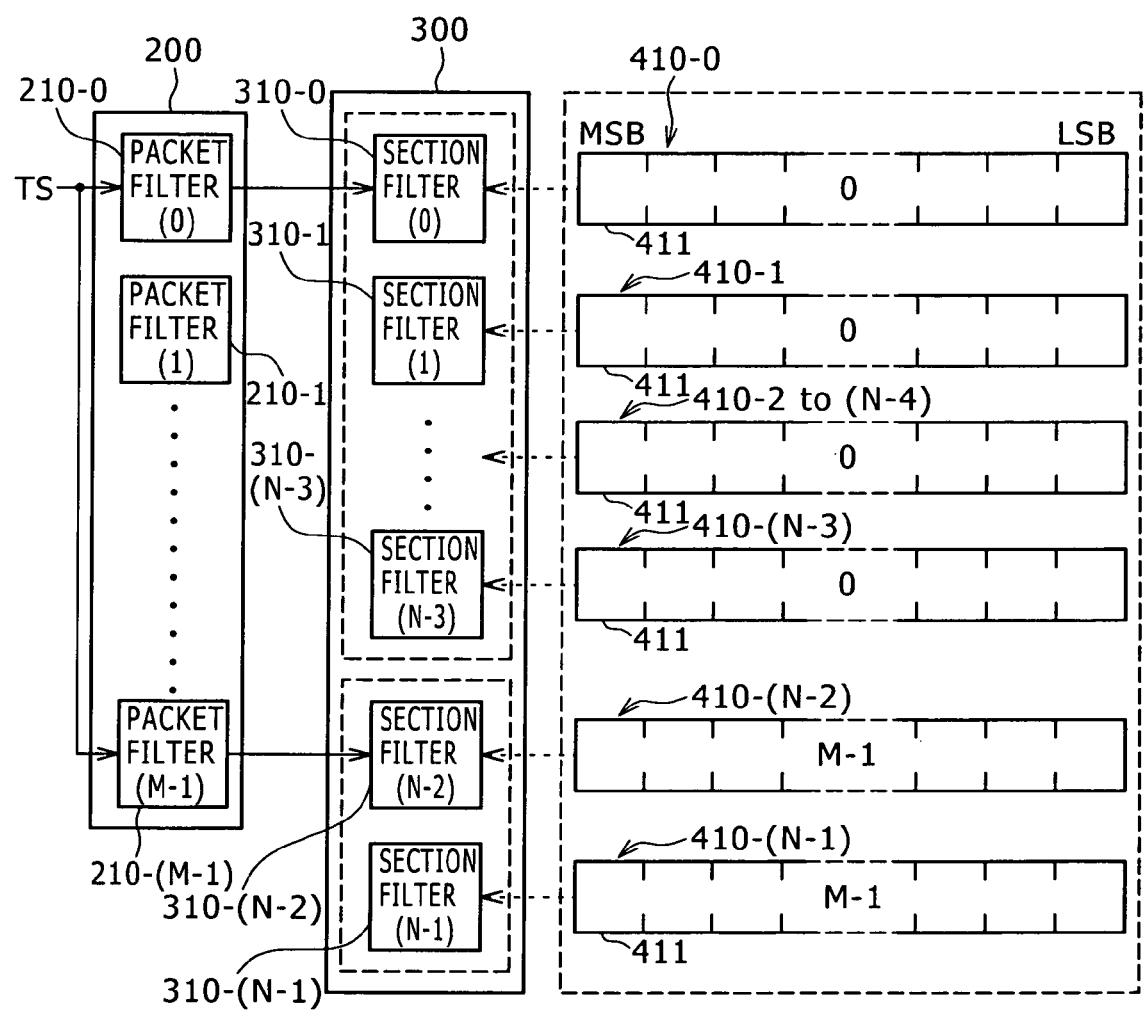
FIG. 6 is a schematic view showing those connective relations between the packet filters and the section filters which are designated by the packet filter connection information.

FIG. 6 schematically shows typical connective relations designated by the packet filter connection information between the packet filters 210 and the section filters 310 illustrated in FIG. 4. FIG. 6 indicates packet filter connection information items 410-0 through 410-(N−1) corresponding to the section filters 310-0 through 310-(N−1) (numbered 0 through (N−1)). Of the packet filter connection information items 410-0 through 410-(N−1), those ranging from 410-0 through 410-(N−3) have each of their packet filter designation information parts 411 set to "0." The settings cause all of the section filters 310-0 through 310-(N−3) to connect to the packet filter 210-0 (numbered 0). The remaining two packet filter connection information items 410-(N−2) and 410-(N−1) have each of their packet filter designation information parts set to "M−1." These settings cause the section filters 310-(N−2) and 310(N−1) to connect to the packet filter 210-(M−1).

As illustrated in FIG. 6, the packet filter connection information 410 used by the first embodiment of the present invention can also establish the same kinds of connections as those shown in FIG. 4. That is, the above-described filter connection requirements can be met by the embodiment. The packet filters 210 are an example of the pre-filters described in the appended claims. The section filters 310 are an example of the post-filters described in the appended claims.

The bit capacity (size) needed by the packet filter connection information 410 as a whole may be expressed as follows: If it is assumed that M stands for the number of packet filters 210 and N for the number of section filters 310, the bit capacity above is given as N×log₂M. This means that compared with the ordinary setup discussed above, the increase in the bit capacity attributable to the growing numbers of packet filters 210 and section filters 310 is significantly suppressed. More specifically, if there are 32 packet filters 210 and 32 section filters 310, the bit capacity amounts to 160 bits. If there are 64 packet filters 210 and 64 section filters 310, the bit capacity rises to 384 bits. If 128 packet filters 210 and 128 section filters 310 are provided, then the bit capacity reaches 896 bits. Compared with the bit capacities associated ordinarily with the same numbers of packet filters 210 and of section filters 310, the bit capacities with this embodiment of the invention exhibit effective reductions.

By suppressing the increase in the bit capacity as described above, this embodiment eliminates the need for limiting the maximum allowable number of section filters 310 that can connect to a single packet filter 210, unlike the case with the ordinary setup. In this manner, the embodiment of the invention provides high flexibility in the connective relations between the packet filters 210 and the section filters 310.

[Typical Overall Structure of the Data Filtering Apparatus Embodying the Present Invention]

Figure 7:
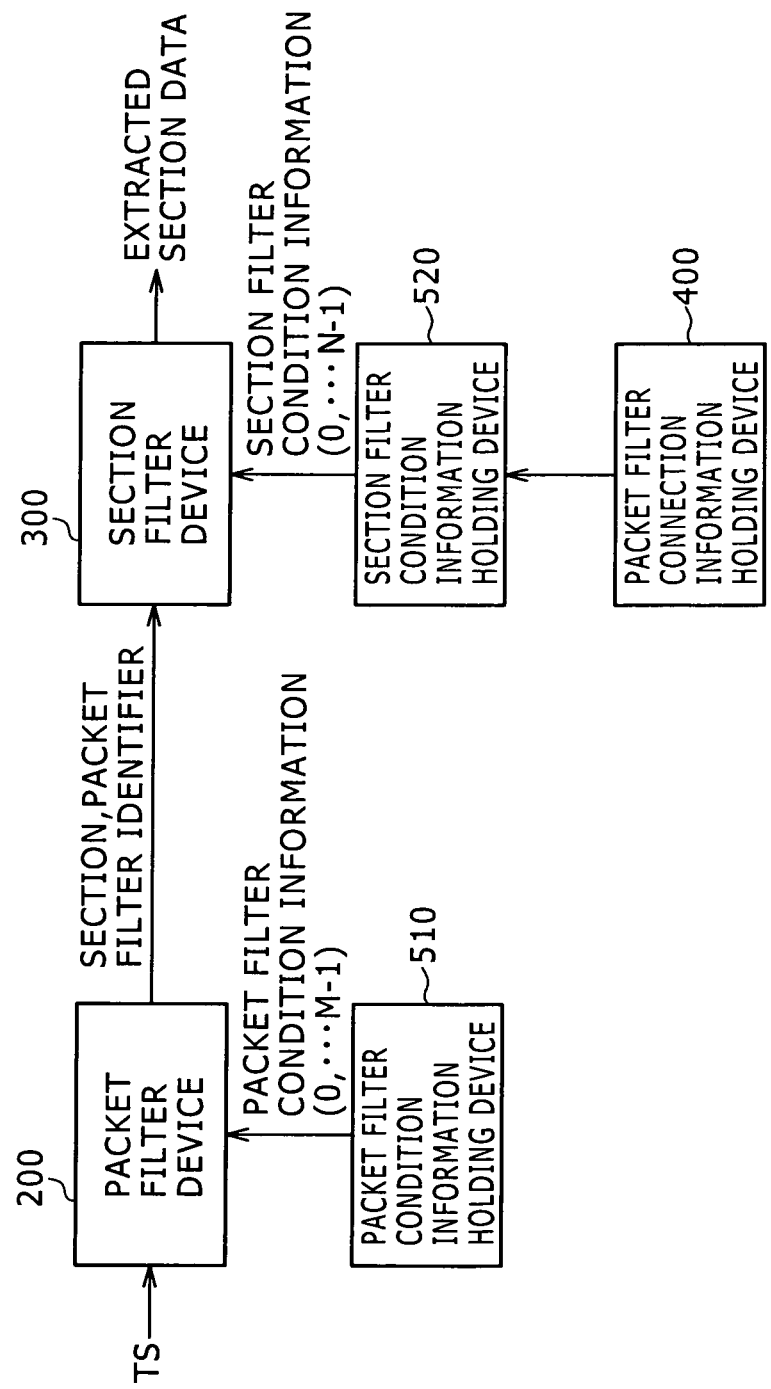
FIG. 7 is a schematic view showing a typical structure of a data filtering apparatus according to the embodiment of the invention.

FIG. 7 shows a typical structure of a data filtering apparatus that extracts section data from transport streams (TS) when embodying the present invention. This data filtering apparatus includes a packet filter device 200 and a section filter device 300 located downstream. That is, the data filtering apparatus has a basic structure for implementing the two-stage filtering process discussed above in reference to FIG. 4. Also, the data filtering apparatus has a packet filter condition information holding device 510, a section filter condition information holding device 520 and a packet filter connection information holding device 400 for use in filtering operations of the packet filter device 200 and the section filter device 300.

For example, the packet filter device 200 may be constituted by M packet filters 210-0 through 210-(M-1) (numbered 0 through (M-1)) as shown in FIG. 6. A transport stream (TS) 600 is input to these packet filters 210-0 through 210-(M-1). Each of the packet filters 210-0 through 210-(M-1) selects a transport stream packet 610 that contains a desired type of data from the transport stream 600 in accordance with the contents of packet filter condition information items #0 through #(M-1), to be discussed later. In addition, the packet filters 210-0 through 210-(M-1) extract the data held in the payload parts 620 in the selected transport stream packets 610. Of the data thus extracted, those making up a section 700 are typically concatenated to reconstitute the format of the section 700 before being output to the downstream section filter device 300.

When outputting the section 700 extracted as described above to the section filter device 300, each of the packet filters 210-0 through 210-(M-1) of this embodiment also outputs information making up the self-identifying packet filter identifier. For example, the packet filter identifier may be information indicative of the number attached to the corresponding packet filter 210.

For example, the section filter device 300 may be constituted by N section filters 310-0 through 310-(N-1) (numbered 0 through (N-1)) as shown in FIG. 6. Each of the section filters 310-0 through 310-(N-1) extracts desired section data from the section 700 input from the packet filter device 200, in accordance with the contents of section filter condition information items #0 through #(N-1), to be discussed later. The section data in this context is the table or message data held in the data part 701 of each section 700 in the packet format shown in FIG. 3. The section data output from the section filter device 300 discussed above is used to form the data of any one of the tables or messages listed in FIG. 1. Alternatively, the section data is used to update the data of a previously acquired table or message.

The packet filter condition information holding device 510 holds the packet filter condition information items #0 through #(M-1) mentioned above. The section filter condition information holding device 520 holds the above-mentioned section filter condition information items #0 through #(N-1). The packet filter connection information holding device 400 holds the packet filter connection information items 410-0 through 410-(N-1), numbered 0 through (N-1) as shown correspondingly in FIG. 6. The section filter condition information items #0 through #(N-1) partly reflect the packet filter connection information items 410-0 through 410-(N-1), as will be discussed later.

FIG. 8 shows a typical structure of the packet filter condition information holding device 510. As shown in FIG. 8, the packet filter condition information holding device 510 is structured to hold packet extraction information items #0 through #(M-1) as packet filter conditions in correspondence with the packet filter numbers #0 through #(M-1). The packet extraction information may be typically formed by the packet identifiers of the transport stream packets to be extracted, among others.

FIG. 9 shows a typical structure of the section filter condition information holding device 520. As shown in FIG. 9, the section filter condition information holding device 520 is structured to hold the section filter condition information in correspondence with the section filter numbers #0 through #(N-1). The entire section filter condition information in this case is made up of the information held in a section extraction information holding portion 521 and in a packet filter designation information holding portion 522. Specifically, each of the section filter condition information items #0 through #(N-1) corresponding to the section filter numbers #0 through #(N-1) is composed of section extraction information items #0 through #(N-1) and packet filter designation information items #0 through #(N-1).

The section extraction information held in the section extraction information holding portion 521 includes a table identifier identifying the type of the section to be extracted by the corresponding section filter 310. The section extraction information also includes the version number of the section type to be extracted by the section filter 310 having the corresponding number. The table identifier and the version number correspond respectively to the table identifier 711 and the version number 714 of the section header 710 shown in FIG. 2.

The packet filter designation information held in the packet filter designation information holding portion 522 includes the number of the packet filter (i.e., packet filter identifier) to be connected with the corresponding section filter 310. Also, the packet filter designation information in the packet filter designation information holding portion 522 is set to have the same content as that of the packet filter designation information part 411 in the packet filter connection information 410 corresponding to the same section filter 310. The section filter condition information holding device 520 is an example of the filter condition information holding device described in the appended claims.

Figure 10:
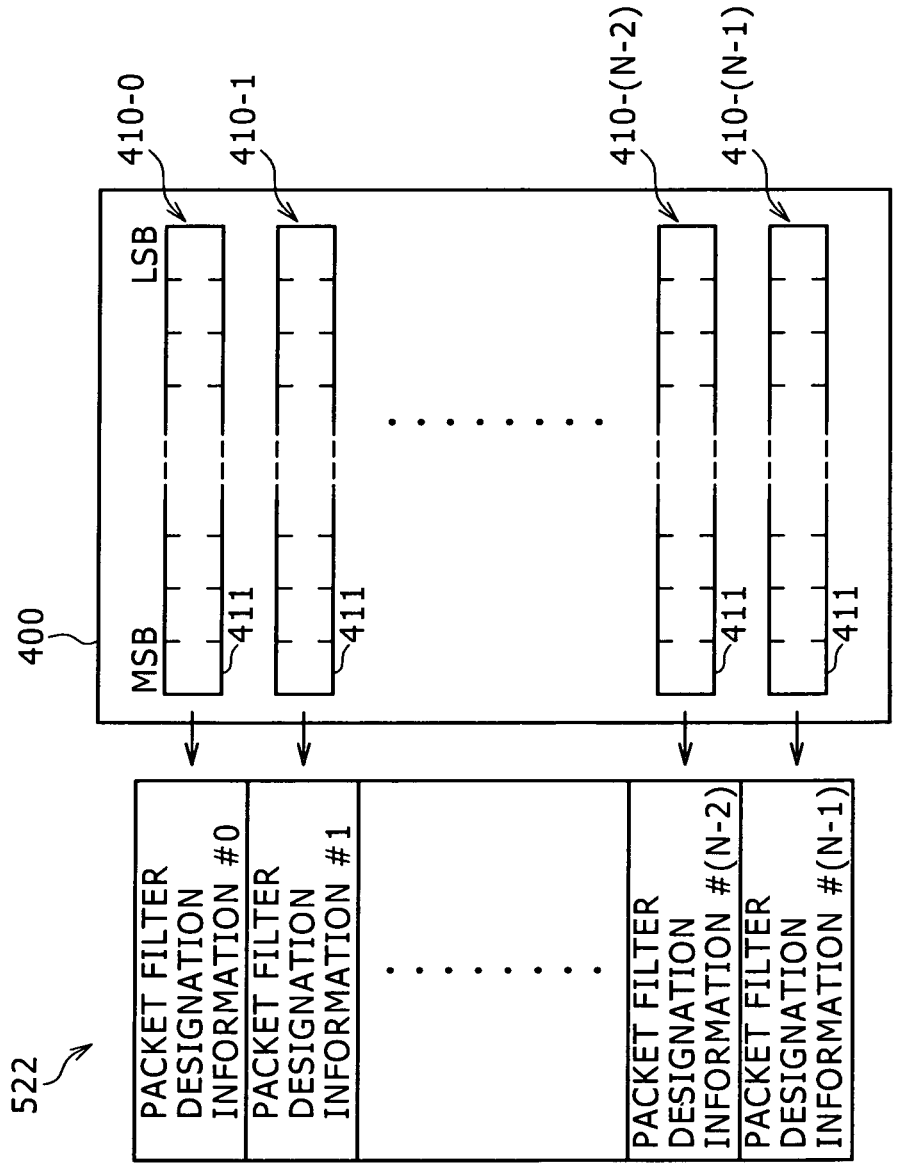
FIG. 10 is a schematic view showing how packet filter designation information is typically set by a first embodiment of the invention.

FIG. 10 schematically shows how values of the packet filter designation information are typically set in the packet filter designation information holding portion 522 described above. As shown in FIG. 10, the packet filter designation information items #0 through #(N-1) in the packet filter designation information holding portion 522 correspond respectively to the packet filter connection information items 410-0 through 410-(N−1) in the packet filter connection information holding device 400. That is, according to the first embodiment of the invention, the packet filter designation information and the packet filter connection information 410 are associated with one another in correspondence with the section filter 310 having the same number. The packet filter designation information #0 corresponding to the section filter 310-0 (numbered 0) is set with the value indicated by the packet filter designation information part 411 in the packet filter connection information 410-0 corresponding to the same section filter 310. In like manner, each of the subsequent packet filter designation information items #1 through #(N−1) is set with the value indicated by the packet filter designation information part 411 in each of the packet filter connection information items 410-1 through 410-(N−1).

According to the embodiment of the invention, the packet filter connection information 410 is assigned to the side of the section filters 310 as described above. This means that the side of the packet filters 210 does not determine the section filters to be connected. For this reason, the packet filters 210 of the embodiment output the extracted sections 700 to all of the section filters 310-0 through 310-(N−1) in the section filter device 300. That is, the packet filters 210 output the sections 700 to the section filters 310 in broadcast fashion.

Figure 11:
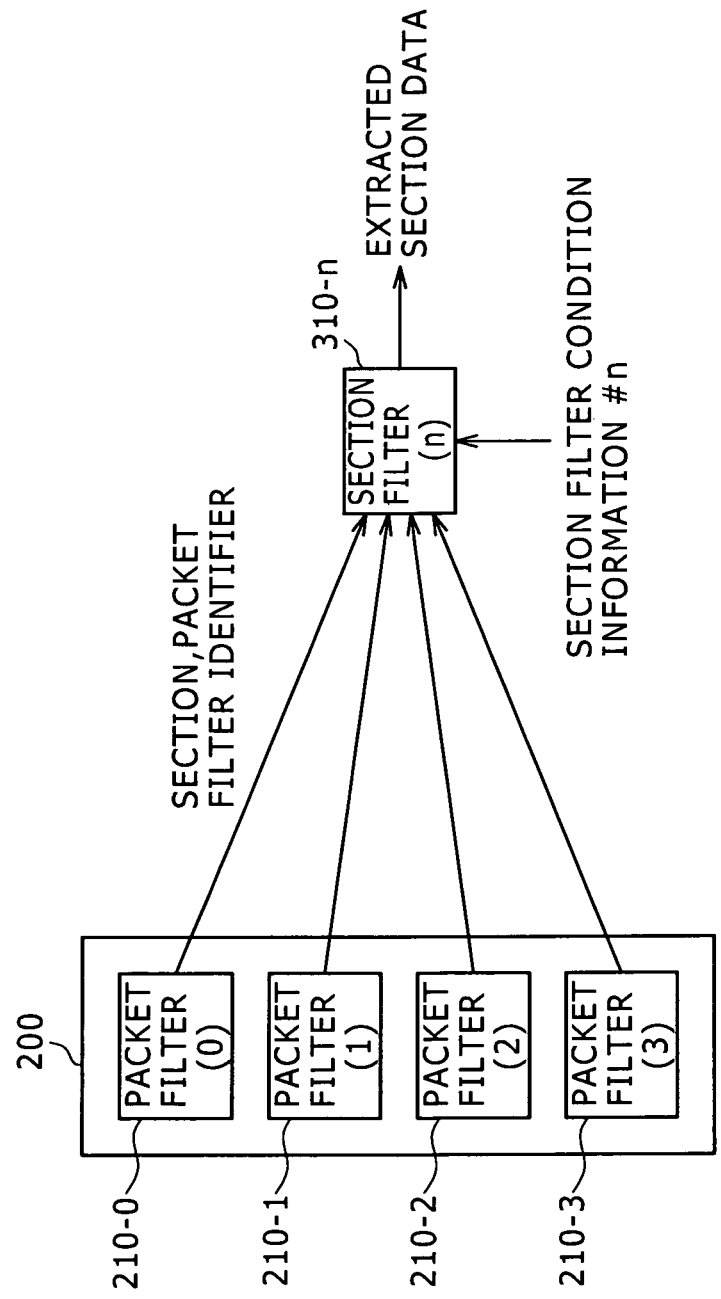
FIG. 11 is a schematic view showing typical input and output relations of sections and packet filter identifiers between a single section filter and all packet filters according to the embodiment of the invention.

FIG. 11 schematically shows typical relations in effect between a single section filter 310 and the packet filters 210 of the packet filter device 200 when the sections 700 are broadcast. In this example, the packet filter device 200 is assumed to have four packet filters 210-0 through 210-3 (numbered 0 through 3). Specifically, FIG. 11 illustrates the relations between the four packet filters 210-0 through 210-3 on the one hand and an (n+1)-th section filter 310-n in the section filter device 300 on the other hand.

As discussed above, each of the four packet filters 210-0 through 210-3 outputs the sections 700 extracted thereby in a broadcast manner. Since the packet filters 210 of this embodiment output the packet filter identifiers in addition to the section 700 as described above, the packet filter identifiers are also broadcast when output. As a result, the sections 700 and packet identifiers output from the packet filters 210-0 through 210-3 in the packet filter device 200 are input to one section filter 310-n as illustrated.

The section filter 310-n performs the process of extracting the target sections to be extracted from the sections 700 output from the packet filters 210 as described above. In performing that process, the section filter 310-n utilizes the section filter condition information #n read from the section filter condition information holding device 520 as well as the packet identifiers output together with the sections 700 from the packet filters 210.

[Typical Structure of a Section Filter]

Figure 12:
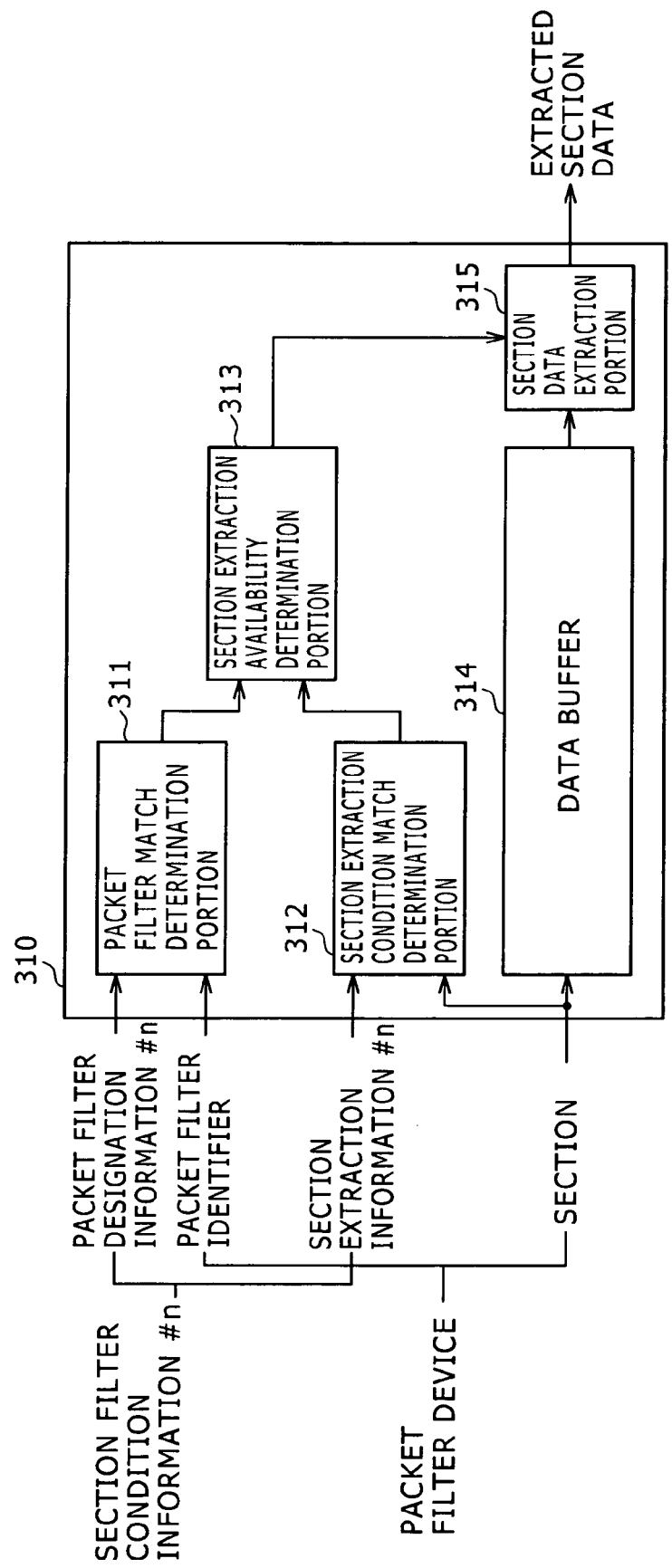
FIG. 12 is a schematic view showing a typical structure of the section filter.

FIG. 12 schematically shows a typical structure of a single section filter 310. This section filter 310 corresponds to the (n+1)-th section filter 310-n shown in FIG. 11. That is, all of the N section filters 310-0 through 310-(N−1) in the section filter device 300 share the structure of the section filter 310 shown in FIG. 12.

The section filter 310 shown in FIG. 12 is made up of a packet filter match determination portion 311, a section extraction condition match determination portion 312, a section extraction availability determination portion 313, a data buffer 314, and a section data extraction portion 315.

The packet filter match determination portion 311 determines whether a packet filter identifier matches the packet filter 210 designated by the packet filter connection information #n. In carrying out the determination, the packet filter match determination portion 311 inputs the packet filter designation information #n found in the section filter condition information #n read from the section filter condition information holding device 520. The packet filter match determination portion 311 also inputs the packet filter identifier output together with the section 700 to the section filter 310-n by the packet filters 210. The packet filter match determination portion 311 then compares the value of the input packet filter designation information #n with the value of the input packet filter identifier before outputting a result of the comparison indicating whether there is a match between the two. If there is a match, that means the packet filter 210 having output the section 700 input to the section filter 310 matches the packet filter 210 designated to be connected by the packet filter connection information #n. If there is a mismatch, that means the packet filter 210 that output the section 700 input to the section filter 310 does not match the packet filter 210 designated by the packet filter connection information #n.

Suppose now that the packet filter match determination portion 311 determines that there is a match between the input packet filter designation information and the input packet filter identifier. The match, however, does not necessarily mean that the input section 700 contains the necessary section data. For example, even if the section 700 was output in transport stream packets 610 of the same packet identifier, the type of the section 700 may have been subdivided into further types by the table identifier 711. Also, those parts of the previously acquired table or message which are not updated are unnecessary; solely the updated data portions need to be extracted and used to update the data of the table or message in question.

The section extraction condition match determination portion 312 determines whether the section 700 input to the section filter 310 meets a section extraction condition. That is, the section extraction condition match determination portion 312 determines whether the section 700 input to the section filter 310 contains the section data to be extracted.

In carrying out the determination above, the section extraction condition match determination portion 312 inputs the section extraction information #n from the section filter condition information #n. The section extraction condition match determination portion 312 also inputs the section 700 from the same packet filter 210 that output the packet identifier input to the above-mentioned packet filter match determination portion 311.

The section extraction condition match determination portion 312 extracts the section header 710 from the input section 700. The section extraction condition match determination portion 312 then compares predetermined items held in the section header 710 with the content of the section extraction information #n. For example, the section extraction information #n contains information about the table identifier and version number corresponding to the section data to be extracted. Typically, the section extraction condition match determination portion 312 may compare the combination of the table identifier 711 and version number 714 in the section header 710 with the combination of the table identifier and version number in the section extraction information #n. If there is a match between the two combinations, that means the section 700 input to the section filter 310 satisfies the section extraction condition.

The section extraction availability determination portion 313 determines whether section data can be extracted from the currently input section 700. In carrying out the determination, the section extraction availability determination portion 313 inputs the result of the determination by the packet filter match determination portion 311 and the result of the determination by the section extraction condition match determination portion 312. If the results of the determinations by the packet filter match determination portion 311 and by the section extraction condition match determination portion 312 both indicate a match, the section extraction availability determination portion 313 outputs a result of the determination indicating that the section data should be extracted. If at least one of the results of the determinations by the packet filter match determination portion 311 and by the section extraction condition match determination portion 312 indicates a mismatch, then the section extraction availability determination portion 313 outputs a result of the determination indicating that the section data should not be extracted.

The data buffer 314 delays the data of the input section 700 by a predetermined time period before outputting the data. It takes some time for the above-mentioned packet filter match determination portion 311, section extraction condition match determination portion 312, and section extraction availability determination portion 313 to complete a series of their determination processes. Thus the data buffer 314 outputs the input section 700 after delaying it by the time period corresponding to the time it takes the series of determination processes to be completed. This provides the appropriate timing for the section data extraction portion 315 (to be discussed later) to input the section 700 in synchronism with the section extraction availability determination portion 313 issuing the result of its determination carried out on the corresponding section 700.

The section data extraction portion 315 extracts the section data from the section 700 input from the data buffer 314, in accordance with the result of the determination performed by the section extraction availability determination portion 313. For example, if the result of the determination by the section extraction availability determination portion 313 indicates that the section data should be extracted, the section data extraction portion 315 extracts the section data from the data part 701 of the input section 700 and outputs the extracted section data. On the other hand, if the result of the determination by the section extraction availability determination portion 313 indicates that the section data should not be extracted, then the section data extraction portion 315 discards the input section 700.

Where the section filter 310 is structured as described above, as long as the result of the determination by the packet filter match determination portion 311 indicates a mismatch, the packet data will not be extracted from the section 700 input at that point from the packet filter 210. The packet data is extracted from the section 700 only when the result of the determination by the packet filter match determination portion 311 indicates a match and when the section extraction condition is met at the same time. That is, with this embodiment, the determination process performed by the packet filter match determination portion 311 may be said to establish the connection with the packet filter 210 designated by the packet filter connection information 410.

[Typical Procedure Performed by the Section Filter]

Figure 13:
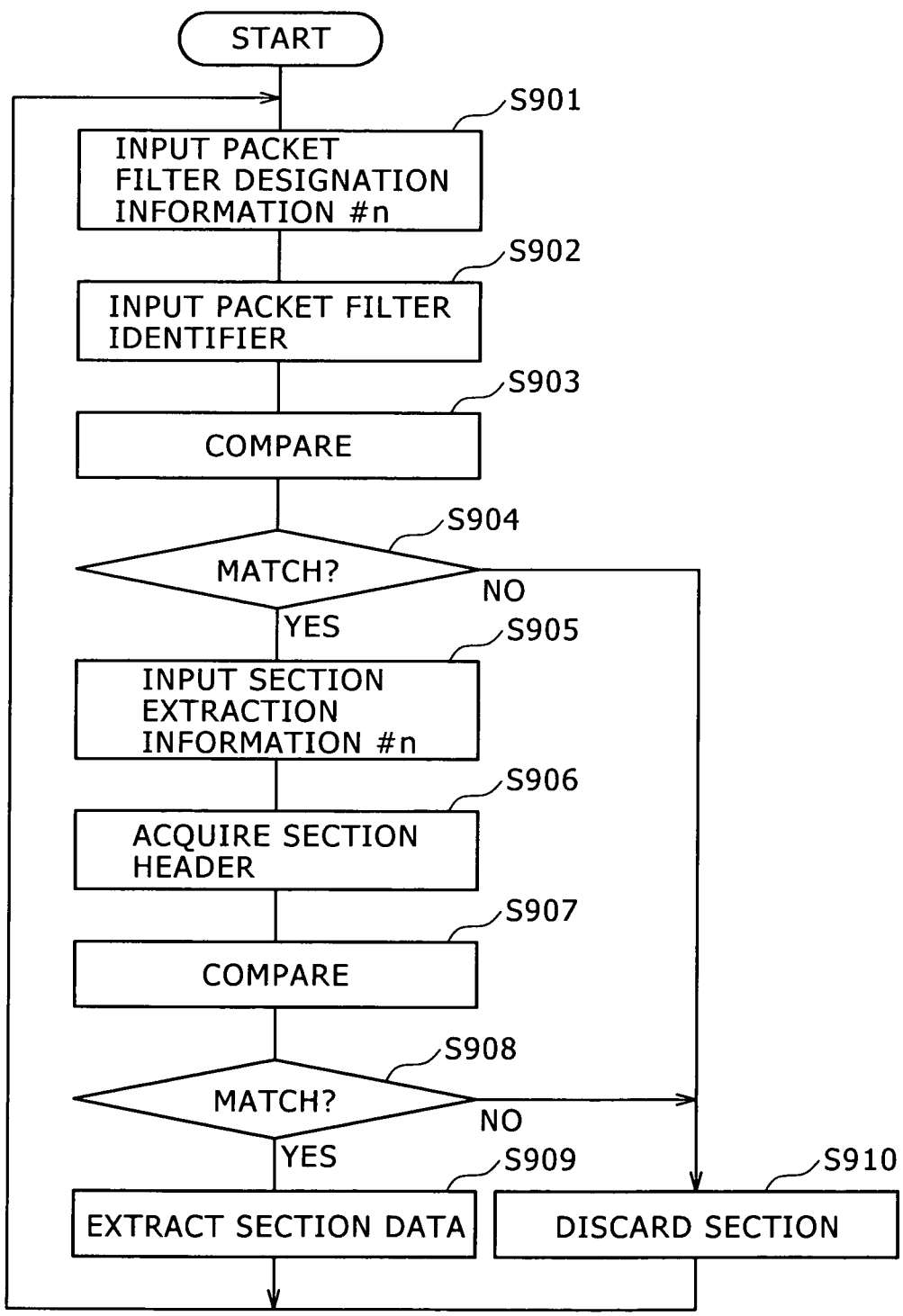
FIG. 13 is a flowchart showing a typical procedure performed by the section filter of the first embodiment.

FIG. 13 is a flowchart showing a typical procedure performed by the section filter 310 shown in FIG. 12. The steps shown in FIG. 13 are carried out suitably by one of the packet filter match determination portion 311, section extraction condition match determination portion 312, section extraction availability determination portion 313, and section data extraction portion 315 indicated in FIG. 12.

First, the packet filter match determination portion 311 inputs a packet filter designation information item #n (in step S901) and a packet filter identifier (in step S902). The packet filter match determination portion 311 then compares the value of the input packet filter designation information item #n with the value of the input packet filter identifier (in step S903). The packet filter match determination portion 311 determines whether there is a match between the two values (in step S904).

If the result of the determination in step S904 turns out to be a mismatch, that is equivalent to the section extraction availability determination portion 313 giving the result of its determination indicating that the section data should not be extracted as has been explained with reference to FIG. 12. In this case, the section data extraction portion 315 discards the input section 700 (in step S910).

By contrast, if the result of the determination in step S904 turns out to be a match, that means the input section 700 has come from the packet filter 210 designated to be connected. In this case, the section extraction condition match determination portion 312 inputs the section extraction information item #n (in step S905). Concurrently, the information of relevant items is acquired from the section header 710 extracted from the input section 700 (in step S906). A comparison is made between the content of the section extraction information item #n and the information content of the relevant items in the section header 710 (in step S907) so as to determine whether there is a match therebetween (in step S908).

By the time the result of the determination in step S908 is found to be a match, the result of a match has already been obtained from step S904. That is, if the result of the determination in step S908 is a match, that is equivalent to the section extraction availability determination portion 313 giving the result of its determination indicating that the section data should be extracted. In this case, the section data extraction portion 315 extracts the section data from the data part 701 of the input section 700 and outputs the extracted section data (in step S909).

On the other hand, if the result of the determination in step S908 turns out to be a mismatch, that means the section extraction availability determination portion 313 has given the result of its determination indicating that the section data should not be extracted. In this case, the section data extraction portion 315 discards the input section 700 (in step S910). The section filter 310 of the first embodiment of the invention repeats the above steps every time a section 700 and packet filter identifier information are input from any one of the packet filters 210 in the packet filter device 200.

According to the first embodiment described above, the packet filter connection information 410 designating the packet filter 200 to be connected to the section filter 300 is made to correspond with the side of the section filter 300. This arrangement first meets the filter connection requirements regarding the packet filters 210 and section filters 310. The increase in the bit capacity reflecting the growing numbers of packet filters 210 and section filters 310 is much less pronounced than before, while the flexibility and convenience of the data filtering apparatus are not impaired.

2. <Second Embodiment>

[Outline of the Second Embodiment]

For the structure of the section filter condition information holding device 520 shown in FIG. 9 as part of the first embodiment of the invention, it was presupposed that each section filter 310 can connect to only one packet filter 210. By contrast, the second embodiment to be described hereunder is structured so that each section filter 310 may connect to two or more packet filters 210. In the ensuing description, each section filter 310 is assumed to be connectable to two packet filters 210 for purpose of simplification and illustration.

Figure 14:
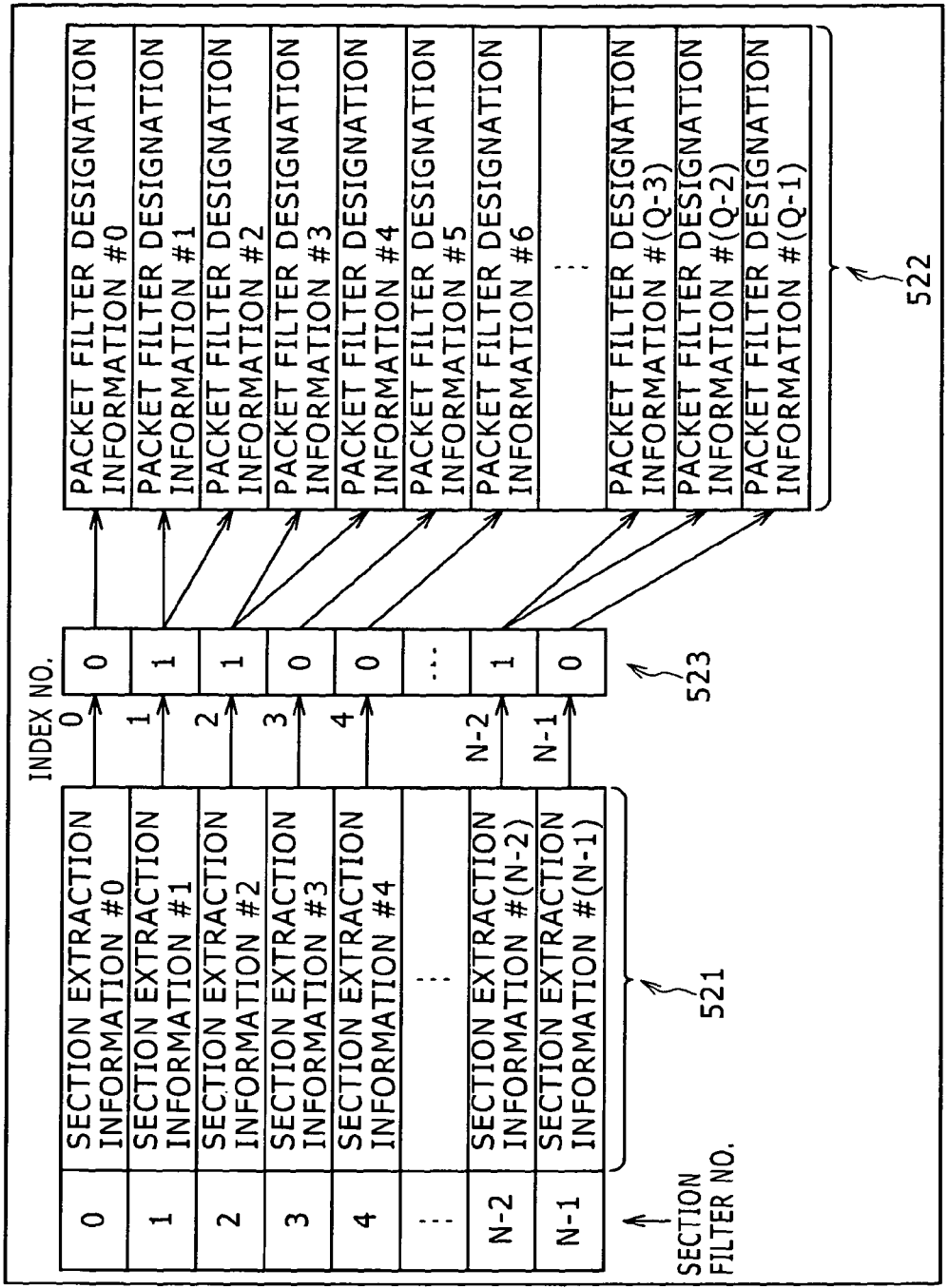
FIG. 14 is a schematic view showing a typical structure of the section filter condition information holding device of a second embodiment of the invention.

FIG. 14 shows a typical structure of a section filter condition information holding device 520A as part of the second embodiment of the invention. In the structure of the section filter condition information holding device 520A, the section extraction information holding portion 521 and packet filter designation information holding portion 522 are supplemented by an information correspondence data portion 523.

In this structure, the number of section extraction information items held in the section extraction information holding portion 521 corresponds to the total number of the section filters configured. That is, as with the case of the structure in FIG. 9, the section extraction information holding portion 521 holds the section extraction information items #0 through #(N−1) corresponding to as many as N section filters 310 numbered 0 through (N−1).

On the other hand, the maximum number of packet filter designation information items held in the packet filter designation information holding portion 522 of the second embodiment is larger than the number of section extraction information items. That is, if N represents the number of section extraction information items held in the section extraction information holding portion 521 and Q denotes the maximum number of packet filter designation information items held in the packet filter designation information holding portion 522, then the relation of N<Q holds. For this reason, in the case of the second embodiment, the numbers 0 through (N−1) attached to the respective section filters 310 do not necessarily match the numbers 0 through (Q−1) assigned to the packet filter designation information items.

The information correspondence data portion 523 is structured to have as many bits as N section extraction information items #0 through #(N−1) as illustrated. That is, the information correspondence data portion 523 has the size of N bits that is equal to the number of the configured section filters. In the information correspondence data portion 523, the bits represented by index numbers 0 through (N−1) correspond respectively to the section filter extraction information items #0 through #(N−1), i.e., to the section filters 310-0 through 310-(N−1) (numbered 0 through (N−1)).

Each of the bits in the information correspondence data portion 523 is set with either "0" or "1." For example, if the bit of the index number #n is set with "0," that means there is one packet filter designation information item corresponding to the section filter extraction information item #n. If the bit of the index number #n is set with "1," that means there are two packet filter designation information items corresponding to the section filter extraction information item #n.

Next, the section extraction information items #0 through #(N−1) are established to correspond with the packet filter designation information items #0 through #(Q−1) as follows: Starting from the section extraction information item #0, each of the section extraction information items #0 through #(N−1) is assigned one or two packet filter designation information items.

More specifically, bit #0 of the information correspondence data portion 523 in FIG. 14 is set with "0," so that the section extraction information item #0 is assigned one packet filter designation information item #0. Next, bit #1 of the information correspondence data portion 523 is set with "1." Thus the section extraction information item #1 is assigned two packet filter designation information items #1 and #2 following the packet filter designation information item #0. Likewise, in accordance with the value of each of the subsequent bits in the information correspondence data portion 523 corresponding to the section extraction information items, each section extraction information item is assigned one or two packet filter designation information items in ascending order of the latter's numbers. Establishing the above type of correspondence presupposes that there is no section filters 310 not connected to any packet filter 210.

Figure 15:
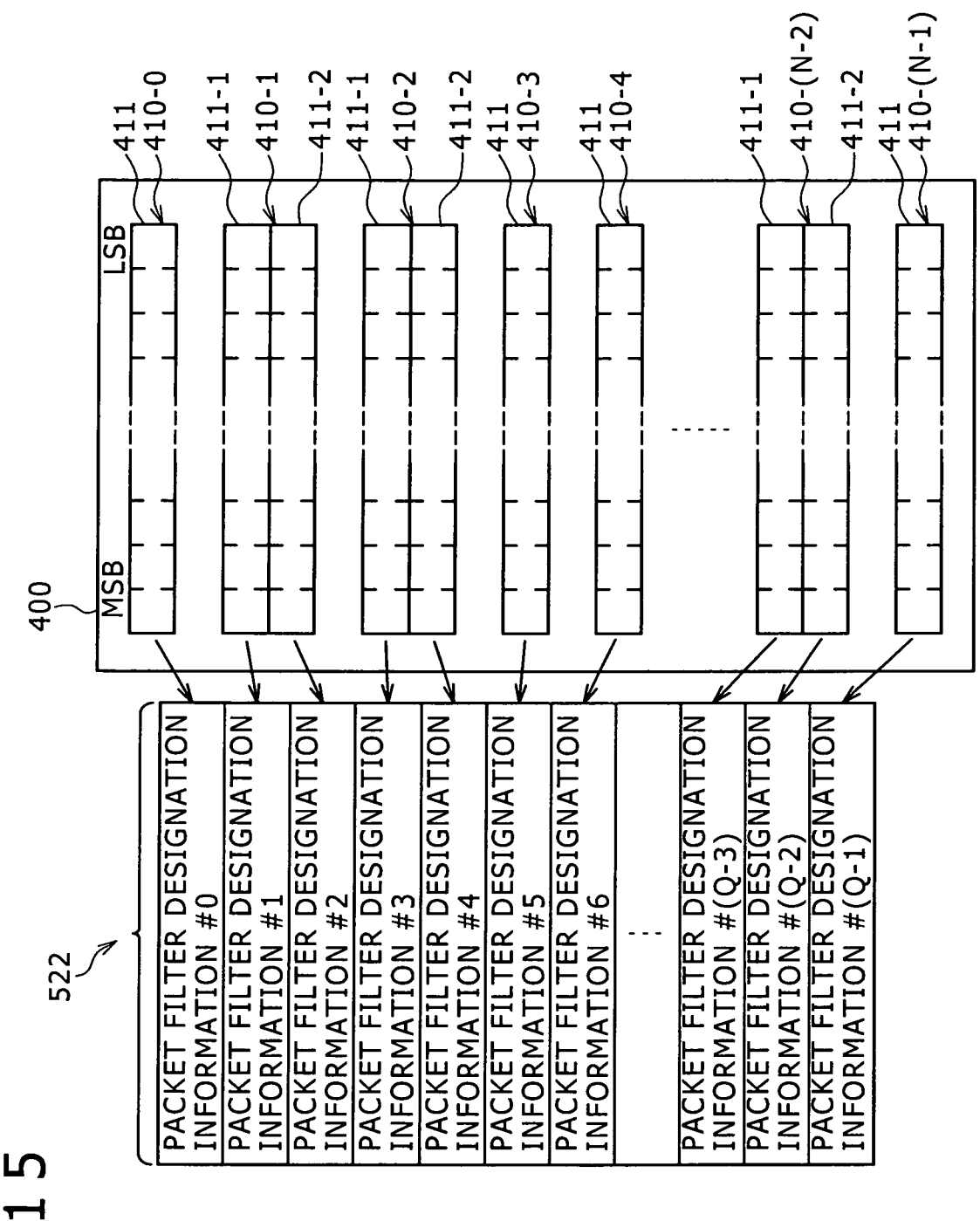
FIG. 15 is a schematic view showing how packet filter designation information is typically set by the second embodiment.

FIG. 15 schematically shows how each of the packet filter designation information items #0 through #(Q−1) is typically set in the packet filter designation information holding portion 522 as part of the second embodiment. The typical settings in FIG. 15 correspond to the relations shown established between the section extraction information items #0 through #(N−1) on the one hand and the packet filter designation information items #0 through #(Q−1) on the other hand in FIG. 14.

In this example, the section filter 310-0 is supposed to connect with one packet filter 210. Correspondingly, the packet filter connection information item 410-0 associated with the section filter 310-0 is formed so as to have one packet filter designation information part 411. And the packet filter designation information item #0 is set with the value held in one packet filter designation information part 411 of the packet filter connection information item 410-0.

Next, the section filter 310-1 is supposed to connect with two packet filters 210. Correspondingly, the packet filter connection information item 410-1 is formed so as to have two packet filter designation information parts 411-1 and 411-2. The packet filter designation information item #1 subsequent to the packet filter designation information item #0 is first set with the value held in the packet filter designation information part 411-1 of the packet filter designation information item 410-1. Then the packet filter designation information item #2 is set with the value held in the packet filter designation information part 411-2 of the packet filter designation information item 410-1. Likewise, each of the subsequent packet filter designation information items #3 through #(Q−1) is set with the value held in one or two packet filter designation information parts 411 in each of the packet filter connection information items 410-3 through 410-(N−1).

Suppose now that without recourse to the information correspondence data portion 523, a structure is devised to make two packet filters 210 connectable with one section filter 310. In this case, for example, the packet filter designation information holding portion 522 accommodates as many as (N×2) packet filter designation information items that have been prepared. Of these (N×2) packet filter designation information items, every two are made to correspond with, say, each section extraction information item beforehand. Then the numbers of the packet filters 210 to be connected are set in each packet filter designation information item in correspondence with the connective relations to be actually brought about between the packet filters 210 and the section filters 310.

In this case, the number Q of the packet filter designation information items held in the packet filter designation information holding portion 522 is up to twice the number N of the section extraction information items held in the section extraction information holding portion 521. It should be noted that the setup of the section filter condition information holding device 520A shown in FIG. 14 presupposes that each of a limited number of section filters 310 is made connectable to two packet filters 210. In this setup, the necessary number of packet filter designation information items (Q) is less than twice the number of section extraction information items (N). However, where the information correspondence data portion 523 is not used, it is mandatory always to prepare twice as many packet filter designation information items as the section extraction information items. That is, under the above-described specifications, an excess number of packet filter designation information items must be provided. With the second embodiment, the number of the packet filter designation information parts 411 in the packet filter connection information 410 is the same as the number of packet filter designation information items. It follows that there must be provided twice as many packet filter connection information items 410 as the section extraction information items.

By contrast, with the structure of the section filter condition information holding device 520A shown in FIG. 14 as part of the second embodiment, as many packet filter designation information items and packet filter connection information items 410 as are necessary need only be provided. This makes it possible to reduce the data size necessary for the section filter condition information holding device 520A as well as the data size for the packet filter connection information holding device 400. If every section filter 310 is made connectable with two packet filters 210, the bit capacity of the packet filter connection information 410 as a whole is given as $$N \times \log_2 M \times 2$$

where, N stands for the number of packet filters 210 and M for the number of section filters 310. Compared with the corresponding capacity of the ordinary setup, the bit capacity above still represents a significant reduction in its increase.

[Typical Procedure Performed by the Section Filter]

Figure 16:
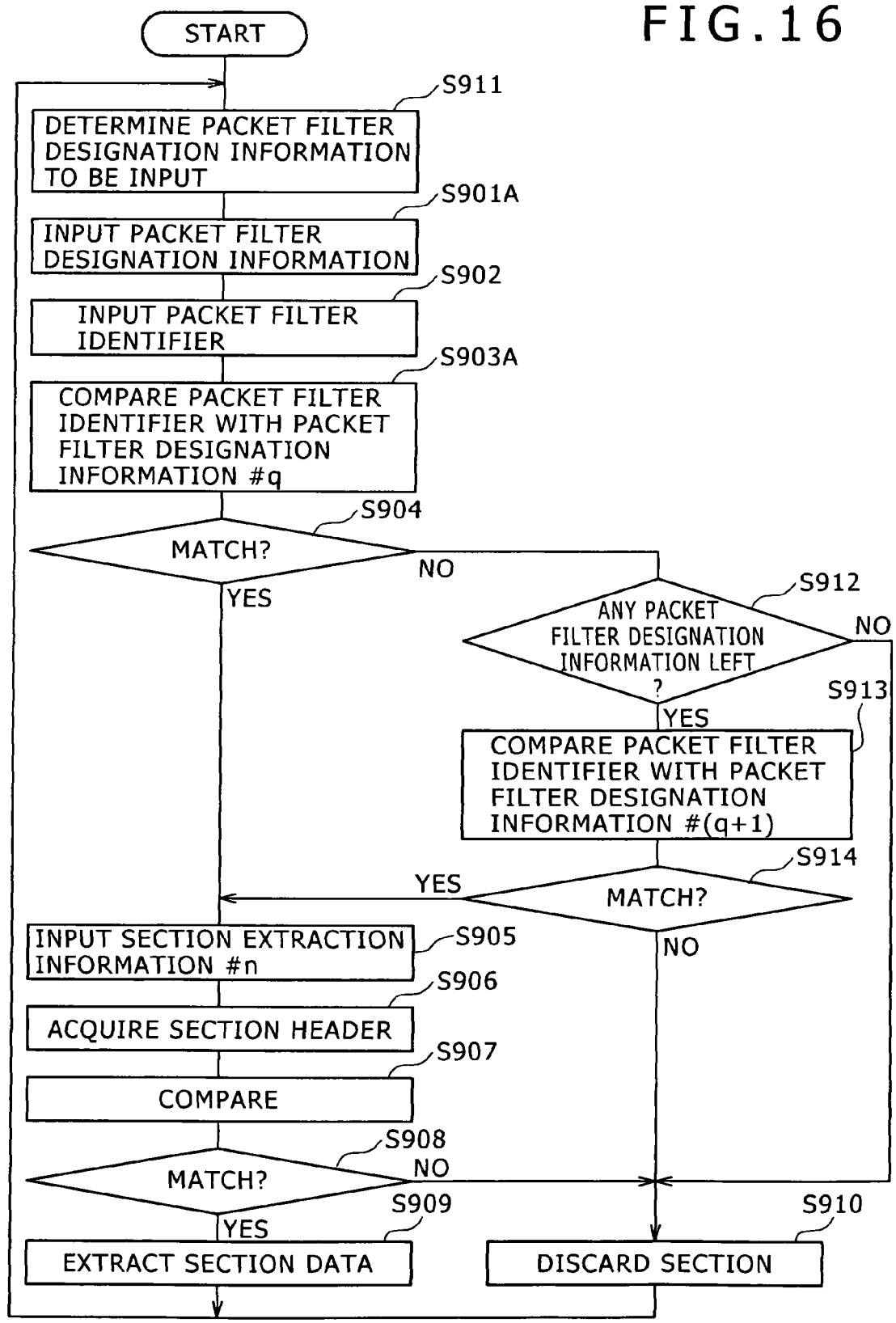
FIG. 16 is a flowchart showing a typical procedure performed by the section filter of the second embodiment.

FIG. 16 shows a typical procedure performed by the section filter 310 of the second embodiment. It is assumed that the section filter 310 carrying out the procedure in FIG. 16 has the same structure as that illustrated in FIG. 12.

With the second embodiment, the packet filter match determination portion 311 first determines the packet filter designation information item to be input from the packet filter designation information holding portion 522 of the section filter condition information holding device 520A (in step S911). The packet filter designation information to be input is either one or two packet filter designation information items assigned to the n-th section filter 310 of interest.

In carrying out its determination, the packet filter match determination portion 311 may typically reference the bit value of the index number #n in the information correspondence data portion 523. Depending on whether the referenced value is "0" or "1," the packet filter match determination portion 311 may first determine whether there is one or two packet filter designation information items to be input. Then the packet filter match determination portion 311 determines the number of the packet filter designation information item by performing operations involving the bit values ranging from the index number #0 to the index number #n, for example. In this example, the starting number of the packet filter designation information item to be input is assumed to be "q." If there are two packet filter designation information items to be input, then the packet filter match determination portion 311 determines that the packet filter designation information items #q and #(q+1) are to be input.

In accordance with the result of the determination above, the packet filter match determination portion 311 carries out the following steps: From the packet filter designation information holding portion 522 of the section filter condition information holding device 520A, either one or two packet filter designation information items determined to be input are retrieved and input (in step S901A). Concurrently, the packet filter identifier is input (in step S902).

Next, the packet filter match determination portion 311 compares the value of the packet filter designation information item #q with the value of the packet filter identifier (in step S903A), to determine whether there is a match between the two values (in step S904). If there are two packet filter designation information items input in step S901A, the comparison in step S903A first addresses the packet filter designation information item identified by the smaller of the two numbers.

If the result of the determination in step S904 turns out to be a mismatch, then a check is made to determine (in step S912) whether there is any packet filter designation information item left that has yet to be compared. If there is only one input packet filter designation information item that has been input, then the determination in step S912 reveals that there is no packet filter designation information item left. In this case, the section data extraction portion 315 discards the input section 700 (in step S910).

On the other hand, if there are two packet filter designation information items that haven been input, the determination in step S912 reveals that there is one packet filter designation information item left to be compared. In turn, the packet filter match determination portion 311 compares the value of the second packet filter designation information item #q+1 with the value of the packet filter identifier (in step S913), to determine whether there is a match between the two values (in step S914).

If the result of the determination in step S914 turns out to be a mismatch, that means the packet filter 210 that output the section 700 is identified neither by the packet filter designation information item #q nor by the item #q+1. In this case, the section data extraction portion 315 discards the input section 700 (in step S910).

On the other hand, if the result of the determination in step S914 or in step S904 is a match, then step S905 and subsequent steps are performed. Step S905 through step S910 are carried out in the same manner as explained above in reference to FIG. 13.

In the foregoing description of the second embodiment, one section filter 310 was shown to be connectable with up to two packet filters 210. Alternatively, a structure may be devised to make each section filter 310 connectable with three or more packet filters 210. Implementing such a structure need only involve setting as many bits as are needed to represent a maximum connectable number of packet filters 210 in each of the index numbers in the information correspondence data portion 523 shown in FIG. 14. For example, if up to eight packet filters 210 are to be connected, then three bits need only be set in each index number.

According to the second embodiment of the invention described above, the section filter condition information holding device 520A is supplemented with the information correspondence data portion 523. This structure allows one section filter 310 to connect with a plurality of packet filters 210 to carry out section data filtering.

<3. Typical Structure of an Appliance to which the Embodiments of the Invention may be Applied>

The data filtering apparatus practiced as the first or the second embodiment of the present invention described above may be applied to diverse appliances including those for receiving digital broadcasts. Explained below is a TV set as one such appliance to which the data filtering apparatus embodying the invention may be applied.

Figure 17:
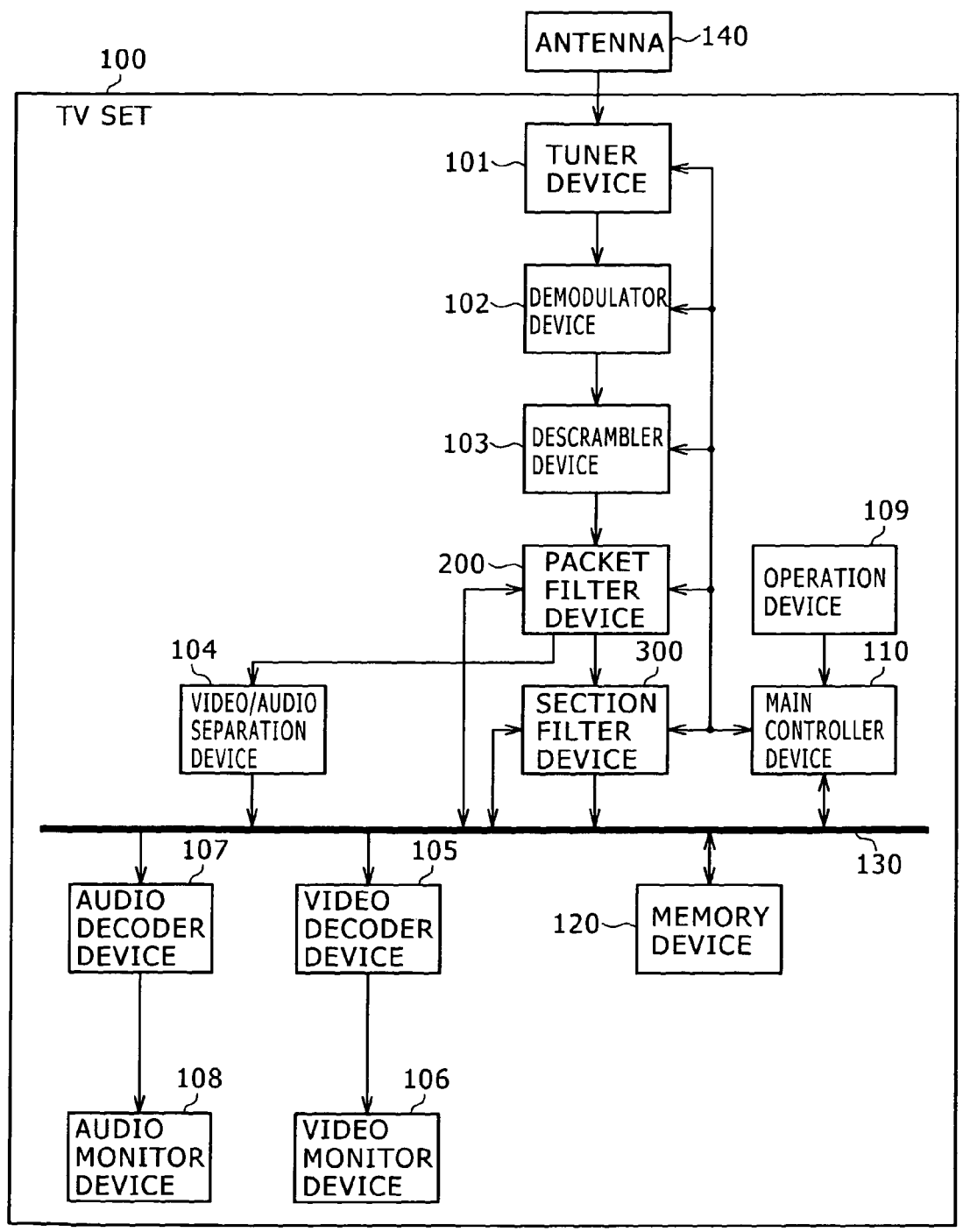
FIG. 17 is a schematic view showing a typical structure of a TV set for use with the embodiments.

FIG. 17 shows a typical structure of a TV set 100 to which the data filtering apparatus of the present invention is applied. The TV set 100 in FIG. 17 is made up of a tuner device 101, a demodulator device 102, a descrambler device 103, a packet filter device 200, a section filter device 300, and a video/audio separation device 104. The TV set 100 also includes a video decoder device 105, a video monitor device 106, an audio decoder device 107, an audio monitor device 108, an operation device 109, a main controller device 110, and a memory device 120. An antenna 140 is connected to the TV set 100.

The antenna 140 receives airwaves. The tuner device 101 inputs received signals stemming from the airwaves captured by the antenna 140. Based on, say, channel tuning information set by the main controller device 110, the tuner device 101 extracts a frequency signal corresponding to a designated digital broadcast channel. The tuner device 101 proceeds to convert the extracted frequency signal typically into a baseband signal before outputting the signal to the demodulator device 102.

The demodulator device 102 performs a demodulation process such as Viterbi decoding and error correction on the baseband signal input from the tuner device 101 using, for example, demodulation control information set by the main controller device 110. The demodulation process provides the signal of a transport stream (TS) 600 containing the data of the designated channel (i.e., program).

The transport stream 600 output from the demodulator device 102 is typically scrambled. The descrambler device 103 descrambles the transport stream 600 on the basis of, for example, limited reception information set by the main controller device 110. The transport stream 600 descrambled by the descrambler device 103 is output to the packet filter device 200.

Based on the packet filter condition set by the main controller device 110, the packet filter device 200 extracts the data held in desired transport stream packets 610 from the input transport stream 600. In this case, if the extracted data is a section 700, the packet filter device 200 outputs the extracted data to the section filter device 300. If the extracted data is video and/or audio data in the PES (packetized elementary streams) format or the like, then the packet filter device 200 outputs the extracted data to the video/audio separation device 104.

Upon admitting the section 700 from the packet filter device 200, the section filter device 300 extracts desired section data based on the section filter condition set by the main controller device 110. The extracted section data is transferred to the memory device 120 by way of a data bus 130, for example. In this case, the data bus 130 is connected not only with the above-mentioned section filter device 300 and memory device 120 but also with the video/audio separation device 104, main controller device 110, packet filter device 200, video decoder device 105, and audio decoder device 107.

The structure of the packet filter device 200 and that of the section filter device 300 shown in FIGS. 6 and 7 for example are included in the setup of FIG. 17 as the packet filter device 200 and section filter device 300, respectively.

The video/audio separation device 104 analyzes the packetized elementary stream (PES) input from the packet filter device 200 and separately extracts video data and audio data from the payload parts of the input stream. The video data and audio data thus extracted are typically transferred to the memory device 120. The video/audio separation device 104 also extracts synchronization control information such as a timestamp held in the header part of the packetized elementary stream and transfers the extracted information to the memory device 120.

The video decoder device 105 performs a decoding process on the video data held in the memory device 120 on the basis of video decode setting information set by the main controller device 110. For example, the decoding process may involve expansion of compression-encoded data. The video signal obtained by the video decoder device 105 through decoding is supplied to the video monitor device 105 to be displayed as an image.

The audio decoder device 107 performs a decoding process on the audio data held in the memory device 120 on the basis of audio decode setting information set by the main controller device 110. The decoding process in this case may also involve expansion of compression-encoded data. The audio signal acquired by the audio decoder device 107 through decoding is sent to the audio monitor device 108 to be reproduced as a sound.

In the above setup, the video decoder device 105 and audio decoder device 107 each input synchronization control information held in the memory device 120 and output the decoded video signal and audio signal respectively in a manner timed with the input synchronization control information. This makes it possible to synchronize images and sounds when they are reproduced and output.

The memory device 120 may be typically composed of a DRAM (dynamic random access memory) or the like. As such, the memory device 120 holds the above-described video data, audio data, and section data as well as other necessary data. The memory device 120 may also be used as a working area by the main controller device 110 during its processing, to be discussed later.

The main controller device 110 may be typically constituted by a CPU (central processing unit) and its peripheral storage device or the like. The main controller device 110 thus structured controls the components of the TV set 100. In dealing with section data, the main controller device 110 performs the following processes. The main controller 110 analyzes the section data held in the memory device 120 so as to generate channel tuning information, demodulation control information, limited reception information, download information, and data broadcast content. For example, the channel tuning information, demodulation control information, and limited reception information are set with regard to the tuner device 101, demodulation device 102, and descrambler device 103 respectively as discussed above. The download information is set, for example, with regard to an auxiliary storage device, not shown. The data broadcast content is combined with the video and/or the audio signal by, say, the video decoder device 105 and/or the audio decoder device 107 for reproduction and output.

The operation device 109 collectively represents the switches, controls, etc., attached to the TV set 100 proper, as well as an operation signal output device that generates operation signals reflecting the operations performed on these switches and controls and feeds the generated signals to the main controller device 110. The operation device 109 may also include a remote control device provided for the TV set 100, and a reception device inside the TV set 100 which receives command signals from the remote control device and converts them into operation signals to be output. The main controller device 110 performs relevant controls and processes in response to the operation signals input from the operation device 109.

In the structure shown in FIG. 17, the filtering of section data is carried out typically as follows. Regarding the currently needed section data, the main controller device 110 sets the appropriate values of the packet filter designation information parts 411 in the packet filter connection information 410 corresponding to the respective section filters 310. For example, the packet filter connection information items 410 are held in the memory device 120. Alternatively, the packet filter connection information items 410 may be held in an SRAM, not shown, furnished in the CPU of the main controller device 110. As another alternative, the packet filter connection information items 410 may be held in circuits such as registers connected to the main controller device 110. That is, in the TV set 100, the packet filter connection information holding device 400 corresponds to the above-described memory device 120 or to the SRAM or registers provided as peripherals of the main controller device 110.

In the above setup, the main controller device 110 generates the packet extraction information using, say, the packet identifier identifying the desired type of sections 700. The packet extraction information thus generated is held in the packet filter condition information holding device 510 in the memory device 120 together with the packet extraction information generated so as to extract other video/audio data (PES). The process of causing the memory device 120 to hold the packet extraction information (i.e., packet filter condition information) in the above manner is equivalent to setting the packet filter condition to the packet filters 210. In this case, the packet filter condition information holding device 510 is furnished inside the memory device 120, for example.

Also, the main controller device 110 generates the section extraction information items #0 through #(N−1) using information such as the table identifier and version number corresponding to the desired section data. Based on the packet filter connection information items 410-0 through 410-(N−1), the main controller device 110 further generates the packet filter designation information items #0 through #(N−1) corresponding to the generated section extraction information items #0 through #(N−1) respectively. This provides the section filter condition information shown in FIG. 9. The main controller device 110 causes the memory device 120 to hold the section filter condition information items thus generated regarding each of the section filters 310. This process corresponds to that of setting the section filter condition to the section filters 310. Also, the section filter condition information holding device 520 is furnished inside the memory device 120.

Each of the packet filters 210-0 through 210(M−1) (numbered 0 through (M−1)) in the packet filter device 200 accesses the memory device 120 to read and input the packet extraction information items #0 through #(M−1) therefrom. The packet filter then selects the transport stream packet 610 whose condition matches the input packet extraction information, and extracts the data from payload part 620 of the selected packet 610.

Also, each of the section filters 310-0 through 310-(N−1) (numbered 0 through (N−1)) in the section filter device 300 reads and inputs the section filter condition information items #0 through #(N−1) held in the memory device 120. The section filter then extracts the section data in a manner such as one explained above in reference to FIG. 12, using the section extraction information and packet filter designation information in the section filter condition information.

According to the above-described workings of the TV set 100, the main controller 110 causes the memory device 120 to hold the packet filter condition information and section filter condition information in the process of setting filter conditions. The packet filter device 200 and section filter device 300 are arranged to access the memory device 120 and input the filter condition information therefrom.

Alternatively, with the TV set 100, the filter conditions may be set as follows: The main controller device 110 may be arranged to generate packet filter condition information and section filter condition information and input the generated information to the packet filter device 200 and section filter device 300 respectively. During this process, however, the main controller device 110 will be heavily loaded. Thus, the packet filter device 200 and section filter device 300 access the packet filter condition information and section filter condition information in the memory device 120 without bypasssing the main controller device 110, as discussed above. In this manner, the processing load on the main controller device 110, among others, is alleviated.

In the foregoing description of the TV set 100 in FIG. 17, the packet filter condition information and section filter condition information were shown to be held in the memory device 120. That is, a partial storage area of the storage device for holding video, audio, and section data is arranged to hold the packet filter condition information and section filter condition information. Alternatively, some suitable element other than the memory device 120 may be used to hold the packet filter condition information and section filter condition information. For example, a memory element independent of the memory device 120 may be provided to accommodate the packet filter condition information and section filter condition information. As another alternative, the packet filter device 200 and section filter device 300 may each be furnished with an internal memory to retain the packet filter condition information and section filter condition information respectively.

In the manner explained above, the TV set 100 shown in FIG. 17 can utilize the data filtering apparatus of the first or the second embodiment to extract and acquire section data from received digital broadcasts.

In addition to the TV set 100, the present invention may be applied, for example, to receivers serving as digital broadcast tuners and to all kinds of appliances having the digital broadcast receiving facilities. The present invention may also be applied to diverse kinds of apparatuses that do not possess digital broadcast receiving facilities but are capable of inputting signals corresponding to transport streams.

Furthermore, the series of steps and processes discussed above as part of the embodiments may be construed as methods for carrying out such steps and processes, as programs for causing a computer to execute such methods, or as a recording medium that stores such programs. For example, the recording medium may be CD (Compact Disc), MD (MiniDisc), DVD (Digital Versatile Disk), a memory card, or a Blu-ray Disc (registered trademark), among others.

The embodiments and their variations described above are merely examples in which the present invention may be implemented. As is clear from above, the particulars of the embodiments and their variations in the description of the preferred embodiments correspond basically to the inventive matters claimed in the appended claims. Likewise, the inventive matters named in the appended claims correspond basically to the particulars with the same names in the description of the preferred embodiments. However, these embodiments and their variations and other examples of the present invention are not limitative thereof, and it should be understood by those skilled in the art that various modifications, combinations, sub-combinations and alterations may occur depending on design requirements and other factor in so far as they are within the scope of the appended claims or the equivalents thereof.

The present application contains subject matter related to that disclosed in Japanese Priority Patent Application JP 2010-123700 filed in the Japan Patent Office on May 31, 2010, the entire content of which is hereby incorporated by reference.

What is claimed is:

1. A data filtering apparatus, comprising:
a plurality of pre-filters configured to extract a designated type of data from input data carrying a plurality of types of data;
a plurality of post-filters configured to extract, from said designated type of data, data that matches a designated data extraction condition, each of said plurality of post-filters being connectable to any of said plurality of pre-filters based on packet filter connection information, wherein said packet filter connection information comprises one or more packet filter designation information parts; and a packet filter connection information holding device configured to hold said packet filter connection information that designates each of said plurality of post-filters for connection with at least one of said plurality of pre-filters, wherein each of said one or more packet filter designation information parts indicates a filter identifier identifying said at least one of said plurality of pre-filters to be connected to one or more of said plurality of post filters.

2. The data filtering apparatus according to claim 1, wherein each of said one or more packet filter designation information parts is formed by a bit sequence configured to indicate a maximum value of said filter identifier.

3. The data filtering apparatus according to claim 1, further comprising a section filter condition information holding device configured to hold filter condition information in correspondence with said each of said plurality of post-filters, said filter condition information associating said data extraction condition with at least one of said filter identifiers indicated by said one or more packet filter designation information parts in said packet filter connection information;

wherein said plurality of post-filters, based on said filter condition information corresponding thereto, extract said data that matches said data extraction condition from said designated type of data that is assigned said filter identifier.

4. The data filtering apparatus according to claim 3, wherein said section filter condition information holding device has an information correspondence data portion indicating a number of said filter identifiers to be associated with each of said data extraction conditions, and in order of numbers assigned to each of said data extraction conditions, each of said data extraction conditions is associated with as many filter identifiers as said number of said filter identifiers indicated by said information correspondence data portion.

5. The data filtering apparatus according to claim 1, wherein said at least one of said plurality of pre-filters outputs said designated type of data to said each of said plurality of post-filters that correspond to said at least one of said plurality of pre-filters according to said packet filter connection information in a broadcast fashion.

6. The data filtering apparatus according to claim 1, further comprising:

a section filter condition information holding device configured to hold first filter condition information in correspondence with said each of said plurality of post-filters; and a packet filter condition information holding device configured to hold second filter condition information in correspondence with each of said plurality of pre-filters.

7. The data filtering apparatus according to claim 1, wherein a number of said plurality of post-filters designated to be connected with said at least one of said plurality of pre-filters is based on a number of said one or more packet filter designation information parts.

8. The data filtering apparatus according to claim 1, wherein a bit count of said one or more packet filter designation information parts is based on a number of said plurality of pre-filters.

9. The data filtering apparatus according to claim 8, wherein a bit count of said one or more packet filter designation information parts is equal to log base 2 of the number of said plurality of pre-filters.

10. The data filtering apparatus according to claim 1, wherein size of said packet filter connection information is a product of a number of said plurality of post-filters and log base 2 of a number of said plurality of pre-filters, when each one of said plurality of post-filters is connected to only one of said plurality of pre-filters.

11. The data filtering apparatus according to claim 1, wherein size of said packet filter connection information is twice the product of a number of said plurality of post-filters and log base 2 of a number of said plurality of pre-filters, when each one of said plurality of post-filters is connected to two of said plurality of pre-filters.

12. A data filtering method, comprising:

extracting, by at least one of a plurality of pre-filters, a designated type of data from input data carrying a plurality of types of data, said at least one of said plurality of pre-filters being designated to be connected by packet filter connection information, wherein said packet filter connection information comprises one or more packet filter designation information parts;

designating a plurality of post-filters for connection to said at least one of said plurality of pre-filters based on said packet filter connection information, wherein each of said one or more packet filter designation information parts indicates a filter identifier identifying said at least one of said plurality of pre-filters to be connected to one or more of said plurality of post filters; and extracting, by said plurality of post-filters from said designated type of data, data that matches a designated data extraction condition.

* * * * *